(12) United States Patent
Inoue

(10) Patent No.: US 8,692,945 B2
(45) Date of Patent: Apr. 8, 2014

(54) LIGHT BARRIER DEVICE AND DISPLAY UNIT

(75) Inventor: Yuichi Inoue, Kanagawa (JP)

(73) Assignee: Sony Corporation, Tokyo (JP)

( * ) Notice: Subject to any disclaimer, the term of this patent is extended or adjusted under 35 U.S.C. 154(b) by 207 days.

(21) Appl. No.: 13/209,551

(22) Filed: Aug. 15, 2011

(65) Prior Publication Data

US 2012/0044451 A1 Feb. 23, 2012

(30) Foreign Application Priority Data

Aug. 20, 2010 (JP) ................................. 2010-185368

(51) Int. Cl.
*G02F 1/1335* (2006.01)
(52) U.S. Cl.
USPC .......................................................... 349/15
(58) Field of Classification Search
USPC .......................................................... 349/15
See application file for complete search history.

(56) References Cited

U.S. PATENT DOCUMENTS

| 2002/0080320 A1* | 6/2002 | Suzuki et al. | 349/153 |
| 2006/0098281 A1* | 5/2006 | Fukushima et al. | 359/464 |
| 2010/0033642 A1* | 2/2010 | Kim | 349/15 |
| 2011/0001894 A1* | 1/2011 | Owaku et al. | 349/15 |

FOREIGN PATENT DOCUMENTS

JP 03-119889 5/1991

* cited by examiner

*Primary Examiner* — Timothy L Rude
(74) *Attorney, Agent, or Firm* — Wolf, Greenfield & Sacks, P.C.

(57) ABSTRACT

There are provided a light barrier device and a display unit for stereoscopic viewing capable of preventing occurrence of light unevenness. The light barrier device, includes: a liquid crystal layer sealed between a pair of substrates, to include a plurality of sub-regions each allowing light to pass therethrough or to be blocked; and spacers each provided, between the pair of substrates, in a region other than boundary region between the sub-regions.

12 Claims, 19 Drawing Sheets

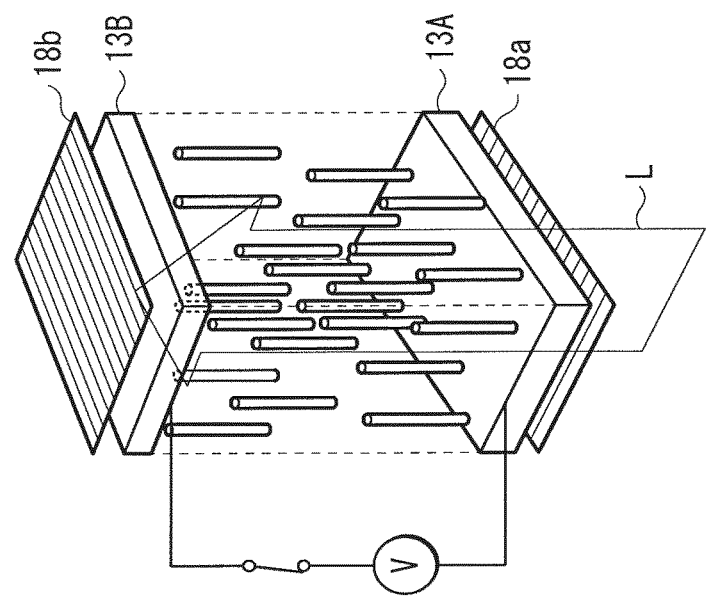
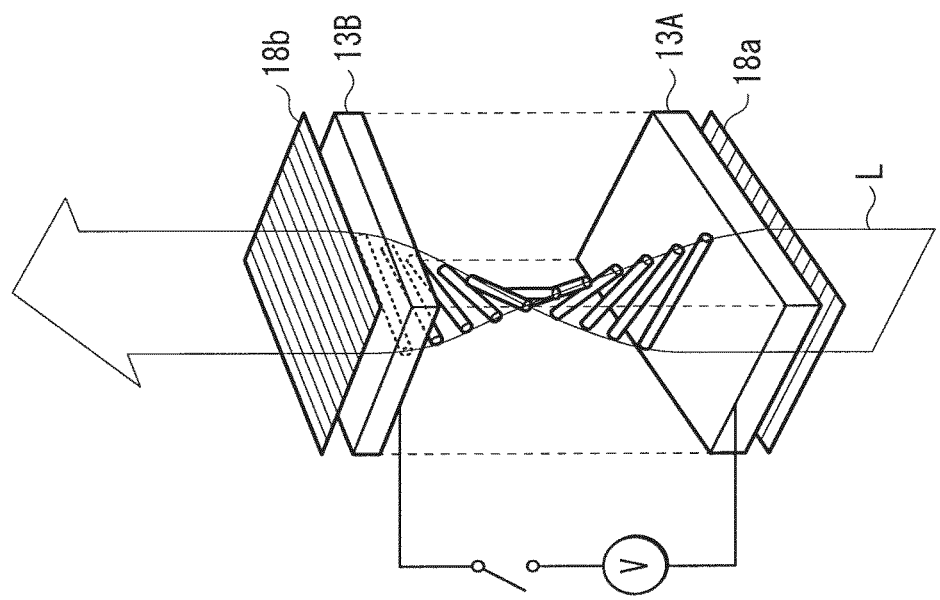

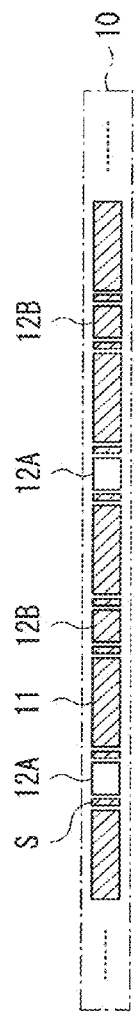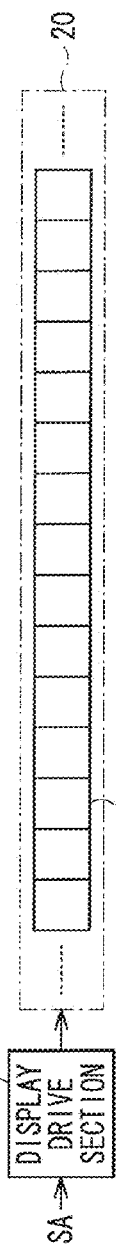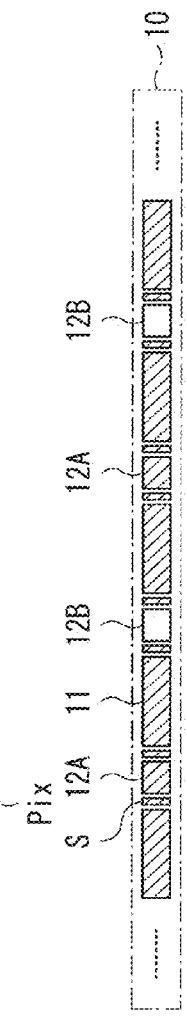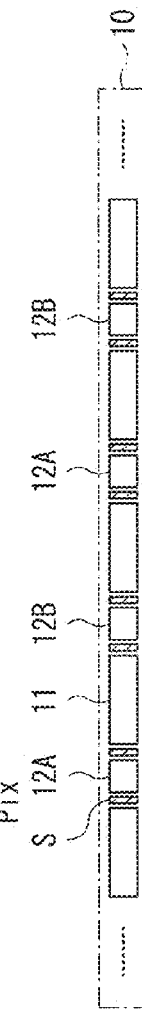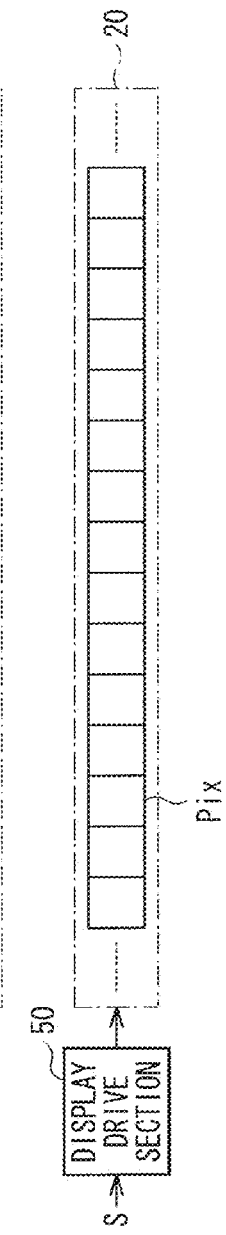
FIG. 9A
FIG. 9B
FIG. 9C

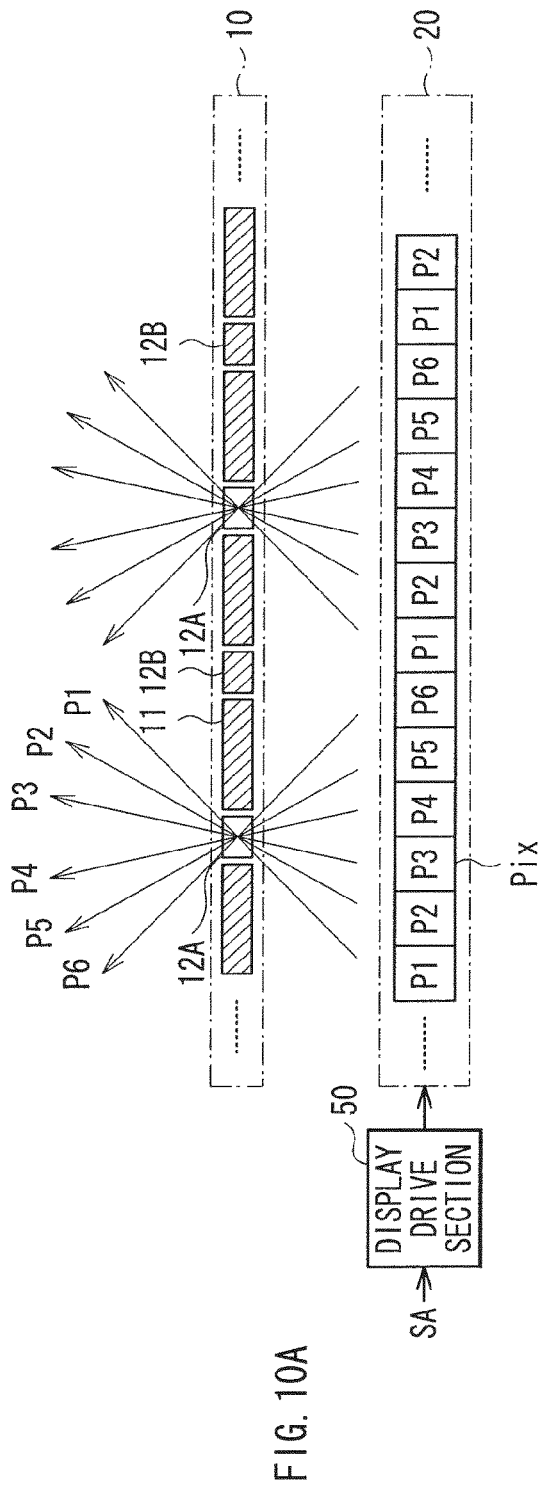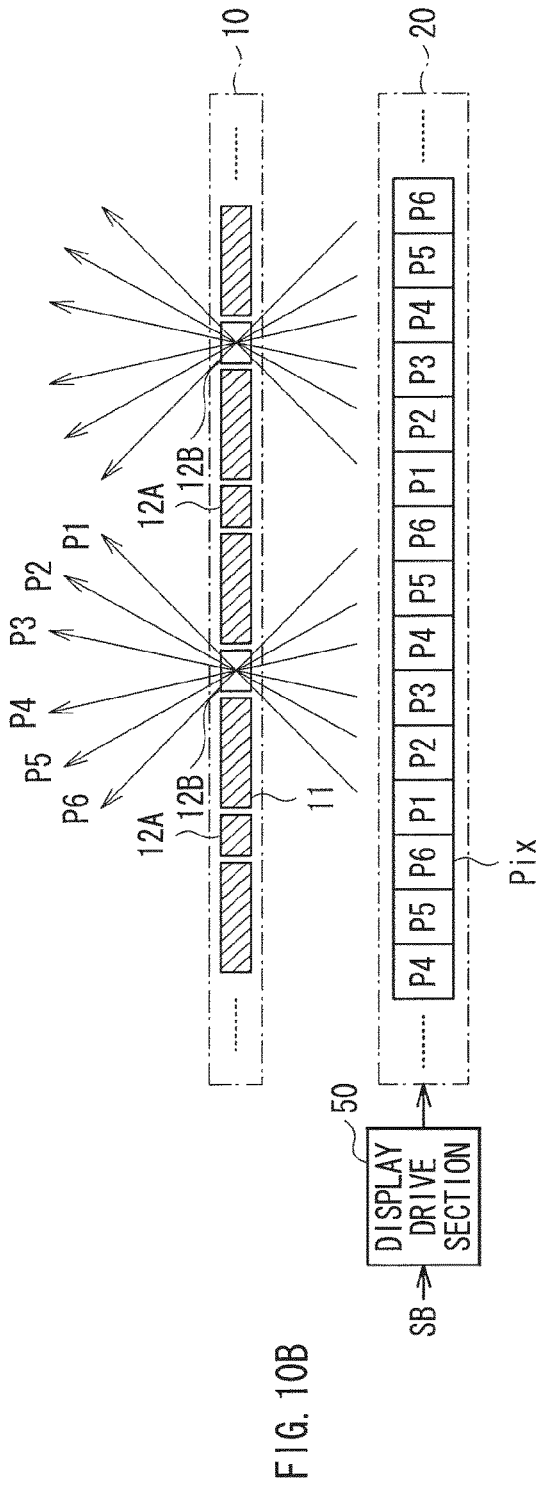
FIG. 10A
FIG. 10B

LIGHT BARRIER DEVICE AND DISPLAY UNIT

CROSS REFERENCE TO RELATED APPLICATIONS

This application claims priority to Japanese Patent Application No. JP 2010-185368, filed Aug. 20, 2010, which application is hereby incorporated by reference in its entirety.

BACKGROUND

The present disclosure relates to a display unit capable of stereoscopic display, and to a light barrier device for use in such a display unit.

SUMMARY

Attention is being given to a display unit realizing stereoscopic display, i.e., a stereoscopic display unit. With the stereoscopic display, a right perspective picture and a left perspective picture are displayed. Since these right and left perspective pictures create parallax, i.e., since these pictures are those viewed from different eyepoints, these pictures look three-dimensional with depth for a viewer when he or she views those by his or her right and left eyes, respectively. Another type of display unit has been also developed which displays three or more pictures with parallax, thereby being able to provide viewers with pictures looking three-dimensional more naturally.

Such a stereoscopic display unit is mainly of two types; a type using glasses specifically designed therefor, and another type not using such glasses. However, since viewers often feel annoying to use such specifically-designed glasses, the type not using glasses is in popular demand. The display unit not using such specifically-designed glasses includes lenticular lens-based, parallax barrier-based, and others.

Specifically with a parallax barrier-based display unit, the right and left perspective pictures as above are spatially divided for display utilizing a liquid crystal display (LCD), for example, and the surface for display thereof is provided with a predetermined barrier (for example, see Japanese Unexamined Patent Application Publication No. 3-119889).

Such a barrier generally includes a plurality of open/close sections for passing or blocking light. With the alternate arrangement of the open/close sections in the pass-through state, i.e., light-passing sections, and those in the not-pass-through state, i.e., light-blocking sections, for example, display pictures are to be separated into various eyepoint directions. Such a barrier in use is the one including two pieces of substrates with a liquid crystal layer sealed therebetween via an electrode, i.e., liquid crystal cell. For example, the electrode on the side of one of the substrates is divided into a plurality of sub-electrodes. These sub-electrodes are each capable of a voltage supply, and each region corresponding to each of the sub-electrodes functions as an open/close section. With such a barrier, a spacer is provided by insertion between the two substrates with the aim of controlling the thickness (cell gap) of the liquid crystal layer described above.

On the other hand, in recent years, such a display unit for stereoscopic viewing as above is expected to be larger in size. With a larger display unit as such, a barrier is also expected to be larger in size. However, in order to manufacture such a large-sized barrier, for keeping the cell gap as is supposed to be, the spacer as described above is expected to be disposed at a plurality of positions.

The issue here is that, since the electrode for a voltage supply to the liquid crystal layer is being divided into a plurality of sub-electrodes as described above, the liquid crystal layer is affected by the edges of the sub-electrodes such that the fringe field is generated. Therefore, if the spacer is disposed at any arbitrary positions, at some positions, the liquid crystal orientation is disturbed due to the influence of the fringe field. Such disturbance of orientation becomes a cause of, in a normally-white mode, for example, non-uniform light leakage during black display, i.e., a phenomenon in which the area where the spacers are disposed and therearound look more whitish than the remaining area due to the passage of light therethrough. As such, there is a disadvantage of causing a phenomenon of light transmittance varying between any local region and the remaining region (hereinafter, simply referred to as "light unevenness").

It is thus desirable to provide a light barrier device and a display unit for stereoscopic viewing capable of preventing occurrence of light unevenness.

A light barrier device according to an embodiment of the present disclosure includes a liquid crystal layer sealed between a pair of substrates, to include a plurality of sub-regions each allowing light to passing therethrough or to be blocked, and spacers each provided, between the pair of substrates, in a region other than boundary region between the sub-regions.

A display unit according to an embodiment of the present disclosure includes a display section, and the light barrier device according to the above-described embodiment of the present disclosure.

With the light barrier device according to the embodiment of the present disclosure, a liquid crystal layer including a plurality of sub-regions each allowing light to pass therethrough or to be blocked is sealed between a pair of substrates, and spacers are provided, between the pair of substrates, in a region other than boundary region between the sub-regions. The sub-regions are each often provided with an electrode, and due to the influence of edges of the electrodes, for example, the boundary portions between the sub-electrodes easily suffer from disturbance of orientation in the liquid crystal layer. If the spacer is disposed in such a boundary portion, the area around the spacer easily suffers from the larger disturbance of orientation therearound. As described above, by providing the spacer not in the boundary portion between the sub-regions, i.e., by providing it in the region other than boundary region between the sub-regions, any local change of transmittance due to such disturbance of orientation is favorably prevented, i.e., a phenomenon in which the area around the spacer looks more whitish than the remaining area during black display due to the too much light leakage therethrough is favorably prevented.

With the light barrier device according to the embodiment of the present disclosure, a liquid crystal layer is sealed between a pair of substrates, and the liquid crystal layer includes a plurality of sub-regions each allowing light to pass therethrough or to be blocked, and spacers are provided in a region other than boundary region between the sub-regions. Therefore, any change of transmittance due to the placement of the spacers, e.g., light leakage during black display, is possibly prevented such that any possible occurrence of light unevenness is to be successfully prevented.

It is to be understood that both the foregoing general description and the following detailed description are exemplary, and are intended to provide further explanation of the technology as claimed.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the technology.

FIGS. 7A and 7B are diagrams respectively illustrating an exemplary orientation of a liquid crystal layer in the pass-through state in the liquid crystal barrier of FIG. 1, and that in the block state therein.

FIGS. 9A to 9C are each a schematic diagram showing an exemplary operation of the display section of FIG. 1, and that of the liquid crystal barrier thereof.

FIGS. 10A and 10B are each another schematic diagram showing an exemplary operation of the display section of FIG. 1, and that of the liquid crystal barrier thereof.

DETAILED DESCRIPTION OF THE PREFERRED EMBODIMENT

In the below, an embodiment of the present disclosure is described in detail by referring to the accompanying drawings. Herein, a description is given in the following order.

1. Embodiment (Exemplary liquid crystal barrier including a spacer on an electrode for white display use)
2. Modification (Exemplary liquid crystal barrier including a spacer in a no-electrode forming region (typically pass-through region)

(Entire Configuration)

Figure 1:
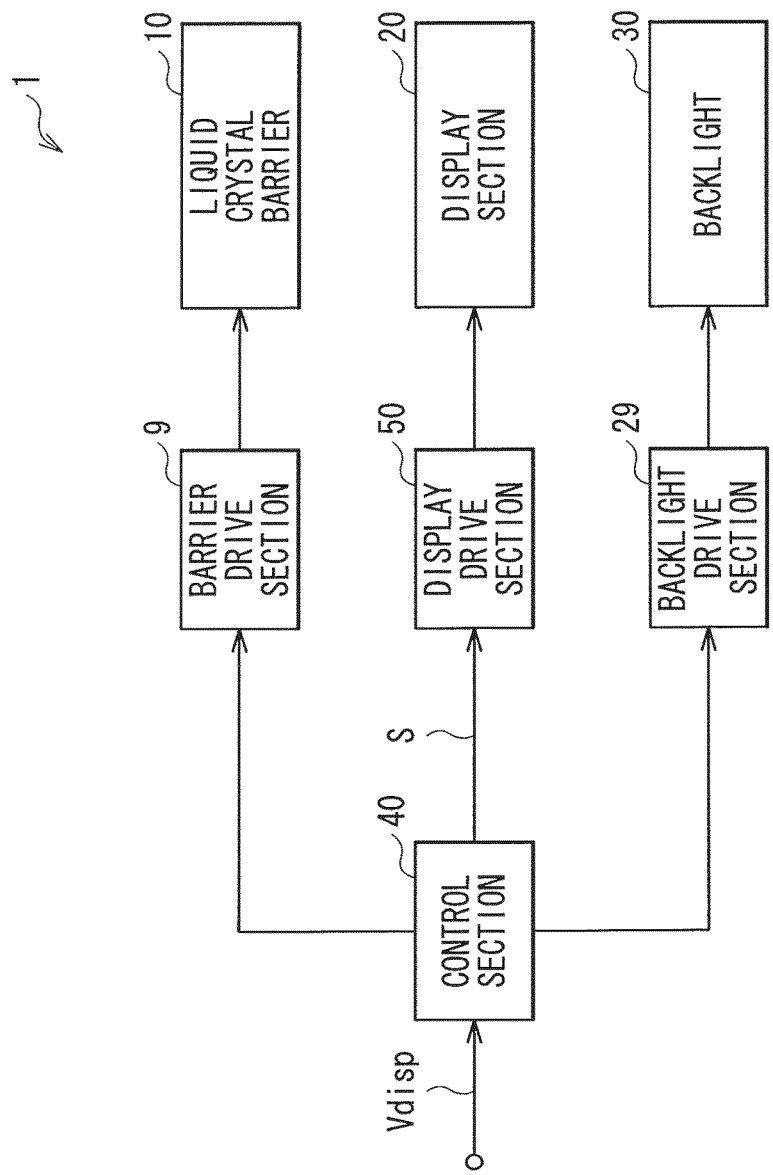
FIG. 1 is a block diagram showing an exemplary configuration of a stereoscopic display unit in an embodiment of the present disclosure.

FIG. 1 is a diagram showing an exemplary configuration of a stereoscopic display unit, i.e., a stereoscopic display unit 1, in an embodiment of the present disclosure. The stereoscopic display unit 1 in this example is a display unit capable of realizing both stereoscopic display and normal display, i.e., two-dimensional display. This stereoscopic display unit 1 is configured to include a control section 40, a display drive section 50, a display section 20, a backlight drive section 29, a backlight 30, a barrier drive section 9, and a liquid crystal barrier 10 (light barrier section, light barrier device).

The control section 40 is a circuit controlling the display drive section 50, the backlight drive section 29, and the barrier drive section 9, to operate in synchronization with one another by providing a control signal to each thereof based on a video signal Vdisp provided from the outside. To be specific, the control section 40 provides the display drive section 50 with a video signal S based on the video signal Vdisp, the backlight drive section 29 with a backlight control command, and the barrier drive section 9 with a barrier control command. Herein, for stereoscopic display by the stereoscopic display unit 1, the video signal S is configured by video signals SA and SB each including a plurality of (six in this example) eyepoint pictures as will be described later.

The display drive section 50 is for driving the display section 20 based on the video signal S provided by the control section 40. The display section 20 is for performing display by modulating light coming from the backlight 30 through driving of liquid crystal elements.

The backlight drive section 29 is for driving the backlight 30 based on the backlight control signal provided by the control section 40. The backlight 30 has a function of emitting surface-emitted light to the display section 20.

The barrier drive section 9 is for driving the liquid crystal barrier 10 based on the barrier control command provided by the control section 40. The liquid crystal barrier 10 includes a plurality of open/close sections 11 and 12 (will be described later), each of which passes or blocks light. In this example, the barrier drive section 9 has a function of dividing light of pictures coming from the display section 20 toward a predetermined direction.

Figure 2A:
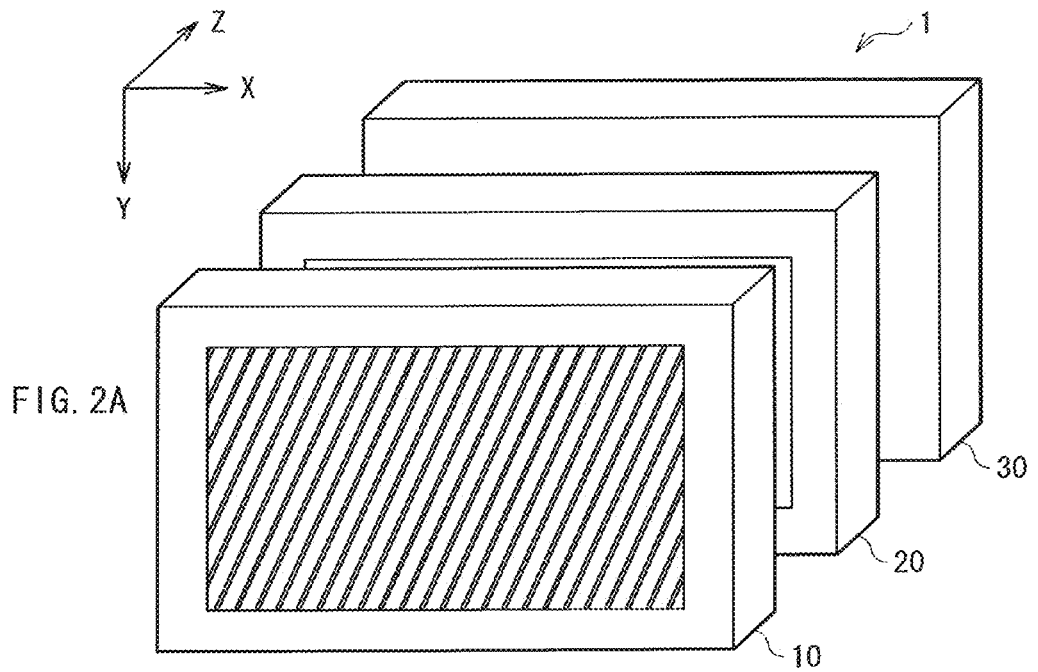
FIGS. 2A and 2B are each a diagram illustrating the exemplary configuration of the stereoscopic display unit of FIG. 1.
Figure 2B:
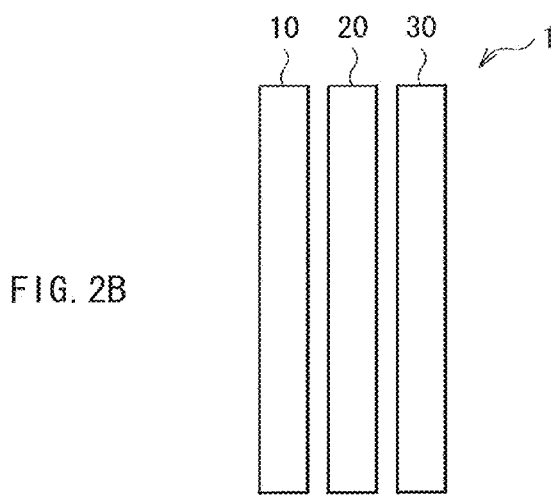

FIGS. 2A and 2B are each a diagram showing an exemplary configuration of the main part of the stereoscopic display unit 1, and specifically, FIG. 2A shows the configuration of the stereoscopic display unit 1 viewed diagonally, and FIG. 2B shows the configuration of the stereoscopic display unit 1 viewed from the side. As shown in FIGS. 2A and 2B, in the stereoscopic display unit 1, the display section 20 and the liquid crystal barrier 10 are disposed in order from the backlight 30 side. In other words, the light coming from the backlight 30 passes through in order the display section 20 and the liquid crystal barrier 10 before reaching a viewer. Note that the display section 20 and the liquid crystal barrier 10 may be attached together or not.

(Display Drive Section 50 and Display Section 20)

Figure 3:
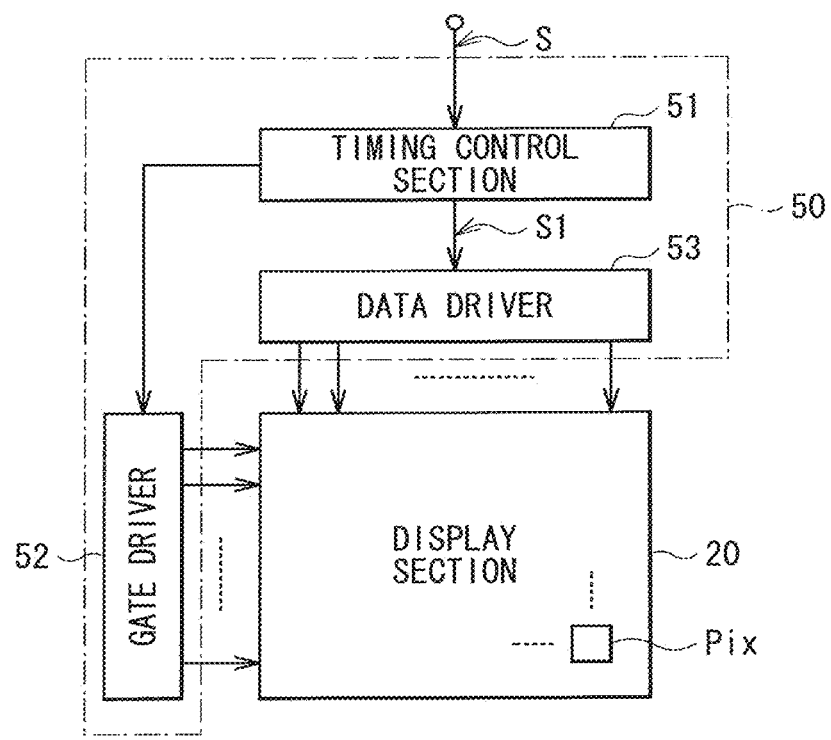
FIG. 3 is a diagram illustrating an exemplary configuration of a display section of FIG. 1, and that of a display drive section thereof.

FIG. 3 shows an exemplary block diagram including the display drive section 50 and the display section 20. Pixels Pix are arranged in a matrix in the display section 20. The display drive section 50 is configured to include a timing control section 51, a gate driver 52, and a data driver 53. The timing control section 51 is for controlling a drive timing of the gate driver 52 and the data driver 53, and for supplying the video signal S provided by the control section 40 to the data driver 53 as a video signal S1. The gate driver 52 is for line-sequential scanning of the pixels Pix (will be described later) in a liquid crystal display unit 45 by making line-based sequential selections thereof. This line-sequential scanning is performed in accordance with the timing control performed by the timing control section 51. The data driver 53 is for supplying, to each of the pixels Pix in the display section 20, a pixel signal based on the video signal S1. To be specific, the data driver 53 performs D/A (Digital/Analog) conversion based on the video signal S1, thereby generating a pixel signal being an analog signal for a supply to each of the pixels Pix.

The display section 20 is the one configured by two transparent substrates with a liquid crystal material filled therebetween. These two substrates are each made of glass, for example. As for each of these transparent substrates, the portion facing the liquid crystal material is formed with transparent electrodes made of ITO (Indium Tin Oxide), for example, thereby configuring the pixels Pix together with the liquid crystal material. Such a liquid crystal material in this display section 20 is exemplified by liquid crystal of VA (Vertical Alignment) mode, of IPS (In-Plane Switching) mode, TN (Twisted Nematic) mode, and others using nematic liquid crystal, for example. In the below, the configuration of the display section 20 (the pixels Pix) is described in detail.

Figure 4A:
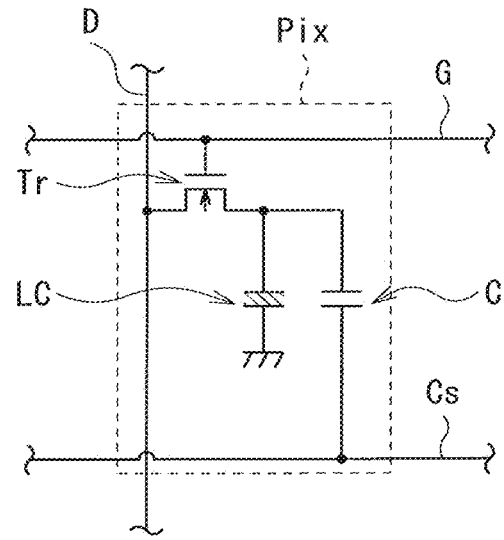
FIGS. 4A and 4B are each a diagram illustrating an exemplary configuration of a pixel circuit of FIG. 3, and an exemplary cross-sectional configuration of a pixel.

FIG. 4A is a diagram showing an exemplary circuit diagram of the pixel Pix. The pixel Pix includes a TFT (Thin Film Transistor) element Tr, a liquid crystal element LC, and a retention capacity element C. The TFT element Tr is made of MOS-FET (Metal Oxide Semiconductor—Field Effect Transistor), for example, and in which the gate is connected to a gate line G, the source is connected to a data line D, and the drain is connected to an end of the liquid crystal element LC and to an end of the retention capacity element C. As for the liquid crystal element LC, an end is connected to the drain of the TFT element Tr, and the remaining end is grounded. As for the retention capacity element C, one end is connected to the drain of the TFT element Tr, and the remaining end is connected to a retention capacity line Cs. The gate line G is connected to the gate driver 52, and the data line D is connected to the data driver 53.

Figure 4B:
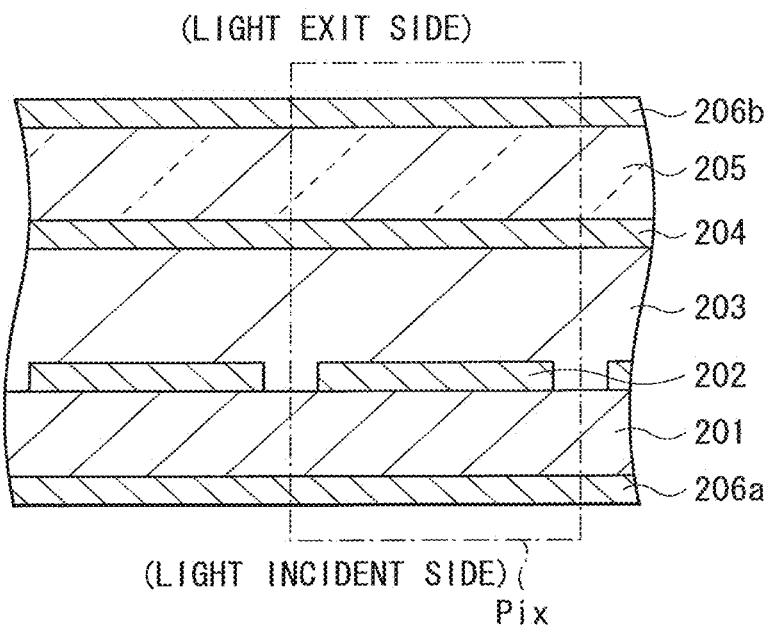

FIG. 4B is a diagram showing the cross-sectional configuration of the display section 20 including the pixels Pix. As such, in the display section 20 in cross-section, a liquid crystal layer 203 is sealed between a drive substrate 201 and an opposing substrate 205. The drive substrate 201 is formed with pixel drive circuits including the TFT elements Tr described above, and on this drive substrate 201, a pixel electrode 202 is provided for each of the pixels Pix. The opposing substrate 205 is formed with a color filter or/and a black matrix that are not shown, and on the surface thereof on the liquid crystal layer 203 side, an opposing electrode 204 is provided for shared use by the pixels Pix. Also in the display section 20, on the light incident side (on the backlight 30 side in this example) and on the light exit side (on the liquid crystal barrier 10 side in this example), polarizing plates 206a and 206b are respectively affixed so as to be in crossed Nichols or in parallel Nichols.

(Backlight 30)

The backlight 30 is configured to include an LED (Light Emitting Diode) or others on the side surface of a light guide plate, for example. Alternatively, the backlight 30 may be configured by the arrangement of a plurality of CCFLs (Cold Cathode Fluorescent Lamps), for example.

(Liquid Crystal Barrier 10)

Figure 5:
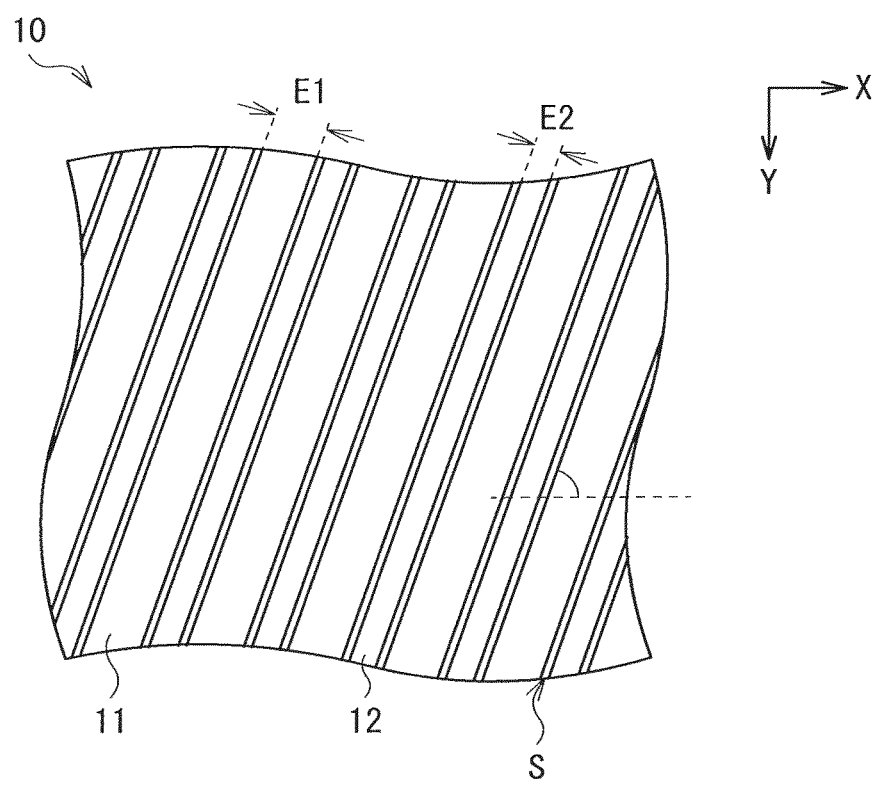
FIG. 5 is a diagram illustrating an exemplary configuration of open/close sections in a liquid crystal barrier of FIG. 1.
Figure 6A:
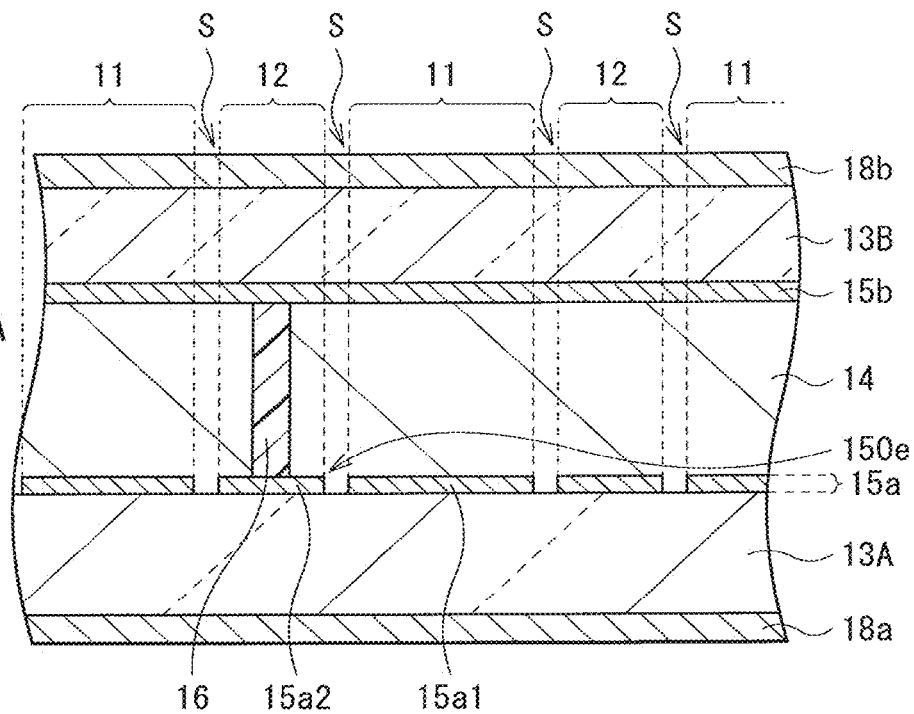
FIGS. 6A and 6B are schematic diagrams respectively showing an exemplary cross-sectional configuration of the liquid crystal barrier of FIG. 1 and an exemplary configuration thereof in a planar view.
Figure 6B:
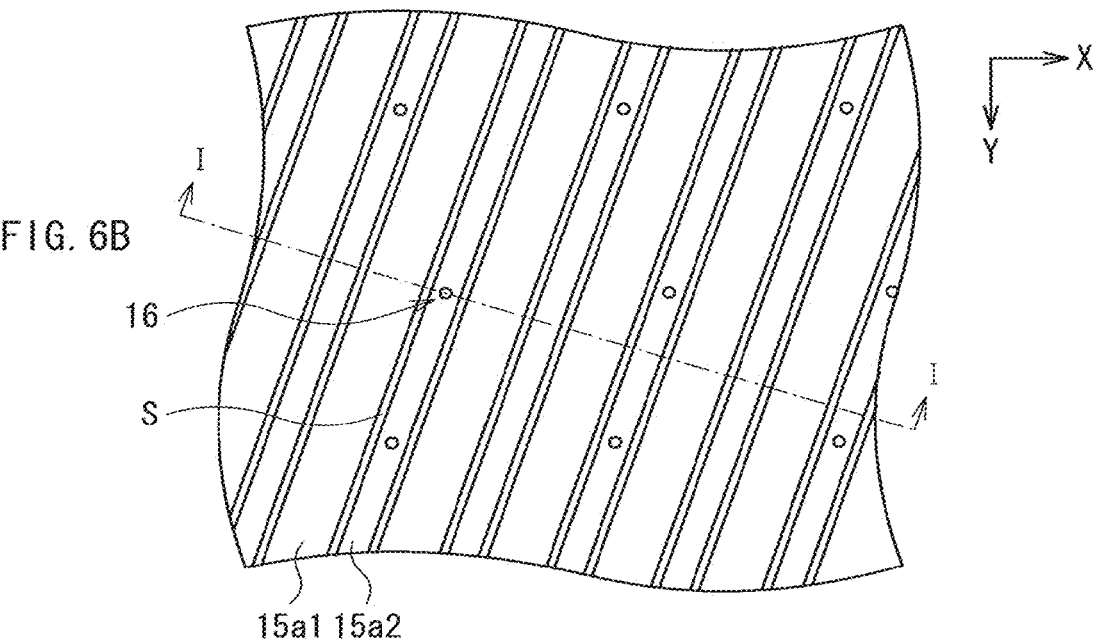

FIG. 5 is a diagram showing the layout configuration of the open/close sections in the liquid crystal barrier 10. FIG. 6A shows the cross-sectional configuration of the liquid crystal barrier 10, and FIG. 6B is a schematic view in the XY plane showing the positional relationship between a transparent electrode layer 15a and spacers 16.

The liquid crystal barrier 10 is a so-called parallax barrier, and as shown in FIG. 5, includes a plurality of open/close sections 11 (second sub-regions), and a plurality of open/close sections 12 (first sub-regions), each of which passes or blocks light. These open/close sections 11 and 12 operate differently depending on which type of display the stereoscopic display unit 1 is to perform, i.e., a normal display (two-dimensional display) or a stereoscopic display. To be specific, as will be described later, the open/close sections 11 are each in the open state (pass-through state) during normal display, and during stereoscopic display, are each in the close state (block state). As will be described later, the open/close sections 12 are each in the open state (pass-through state) during normal display, and during stereoscopic display, each perform an open/close operation in a time divisional manner. The open/close sections 11 and 12 as such are disposed each alternately such that any of the open/close sections 11 and 12 may be selectively driven as a group, or such groups may be driven in a time divisional manner, for example.

These open/close sections 11 and 12 are so disposed as to extend each via a boundary section S in one direction in the XY plane, e.g., a direction at a predetermined angle of θ from the horizontal direction X herein. The open/close sections 11 and 12 respectively have widths E1 and E2, which vary in value and have a relationship of E1>E2 herein, for example. Note that the open/close sections 11 and 12 are not restricted to have such a relationship of width size, and E1<E2 will also do, or E1=E2. The boundary section S is a portion corresponding to a slit between sub-electrodes 15a1 and 15a2 that will be described later, for example. The open/close sections 11 and 12 as such are each configured to include a liquid crystal layer, i.e., a liquid crystal layer 14 that will be described later, and are each opened and closed according to a drive voltage to this liquid crystal layer 14.

To be specific, as shown in FIG. 6A, the liquid crystal barrier 10 is configured to include the liquid crystal layer 14 between transparent substrates 13A and 13B each made of glass, for example. As for these transparent substrates 13A and 13B, the transparent substrate 13A is disposed on the light incident side, and the transparent substrate 13B is disposed on the light exit side. The surface of the transparent substrate 13A on the liquid crystal layer 14 side is formed with the transparent electrode layer 15a, and the surface of the transparent substrate 13B on the liquid crystal layer 14 side is formed with a transparent electrode layer 15b. These transparent electrode layers 15a and 15b are each made of ITO, for example. The transparent substrate 13A is affixed with a polarizing plate 18a on the light incident side, and the transparent substrate 13B is affixed with a polarizing plate 18b on the light exit side. In the below, the configuration of each of the components is described in detail.

The liquid crystal layer 14 is made of liquid crystal of TN mode (TN liquid crystal), for example. In this embodiment, exemplified is a case where this liquid crystal layer 14 is driven in the normally-white mode, e.g., the liquid crystal layer 14 passes light therethrough with no application of a drive voltage (FIG. 7A), i.e., a white display is performed, and blocks light with application of a drive voltage (FIG. 7B), i.e., a black display is performed. More in detail, during white display with no application of a drive voltage, directors of liquid crystal molecules are orthogonal to one another between the light incident and exit sides, and are aligned in various orientations while rotating along the thickness direction of the liquid crystal layer 14. During black display with application of a drive voltage, on the other hand, the directors of liquid crystal molecules are so aligned as to go along the thickness direction of the liquid crystal layer 14.

As for the transparent electrode layers 15a and 15b, one or both of these are divided into a plurality of sub-electrodes each capable of an individual voltage supply. As an example, the transparent electrode layer 15a is divided into a plurality of sub-electrodes 15a1 and 15a2, and the transparent electrode layer 15b is provided as an electrode for shared use by these sub-electrodes 15a1 and 15a2. The regions corresponding to the sub-electrodes 15a1 and 15a2 are the open/close sections 11 and 12, respectively, and are each equivalent to a sub-region according to the embodiment of the present disclosure. Such a configuration allows application of a voltage only to any selective region of the liquid crystal layer 14 such that the open/close sections 11 and 12 are each changed in state, i.e., the pass-through state (white display) or the block state (black display). As for these transparent electrode layers 15a and 15b, the surfaces on the liquid crystal layer 14 side are each formed with an orientation film that is not shown.

The polarizing plates 18a and 18b are each for controlling a polarization direction of light entering into the liquid crystal layer 14 and that of light exiting therefrom. When the liquid crystal layer 14 is made of TN liquid crystal, for example, absorption axes of these polarizing plates 18a and 18b are so disposed as to be orthogonal to each other.

(Placement of Spacers 16)

In such a liquid crystal barrier 10, a spacer 16 is disposed by insertion between the transparent substrates 13A and 13B for controlling the thickness of the liquid crystal layer 14. The spacer 16 is made of resin such as photoresist, for example, and is shaped like a column, e.g., like a cylinder. As shown in FIGS. 6A and 6B, this spacer 16 is provided to a plurality of selective regions on the XY plane of the liquid crystal barrier 10, specifically to regions not including the boundary sections S, i.e., portions other than boundary region between the open/close sections 11 and 12. In this embodiment, the spacers 16 are each absent from an edge 150e (end edge section) of the sub-electrode 15a2, i.e., are each disposed at the center portion on the sub-electrode 15a2 in this example. In other words, the spacers 16 are each provided not to lie across the region between the sub-electrodes 15a1 and 15a2 (the boundary section S).

The spacers 16 as such may be provided in any region not including the boundary section S as described above, but desirably, as in this embodiment, are each disposed on the sub-electrode 15a2 of the open/close section 12 where light is to be passed therethrough during stereoscopic display, i.e., white display region. However, this is surely not restrictive, and the spacers 16 may be each disposed on the sub-electrode 15a1 in the open/close section 11.

Note that, in this embodiment, the open/close section 11 has the width E1, i.e., the width of the sub-electrode 15a1, of 50 to 200 μm, for example, the open/close section 12 has the width E2, i.e., the width of the sub-electrode 15a2, of 100 to 500 μm, for example, and the boundary section S has the width of 4 to 20 μm, for example. The spacer 16 has the diameter, i.e., the diameter of the circular-shaped portion on the XY plane, of 10 to 30 μm, for example.

In this example, the liquid crystal barrier 10 is exemplified as operating in the normally-white mode, but this is surely not restrictive, and alternatively, the liquid crystal barrier 10 may operate in a normally black mode, for example. A selection between the normally black operation and the normally-white operation as such is made by the polarizing plates and the liquid crystal orientation.

For stereoscopic display, the barrier drive section 9 drives the open/close sections 11 and 12 to perform the open/close operation at the same timing. To be specific, although the details will be described later, the barrier drive section 9 drives a plurality of open/close sections 12 in a group A and a plurality of open/close sections 12 in a group B to alternately open and close in a time divisional manner.

Figure 8:
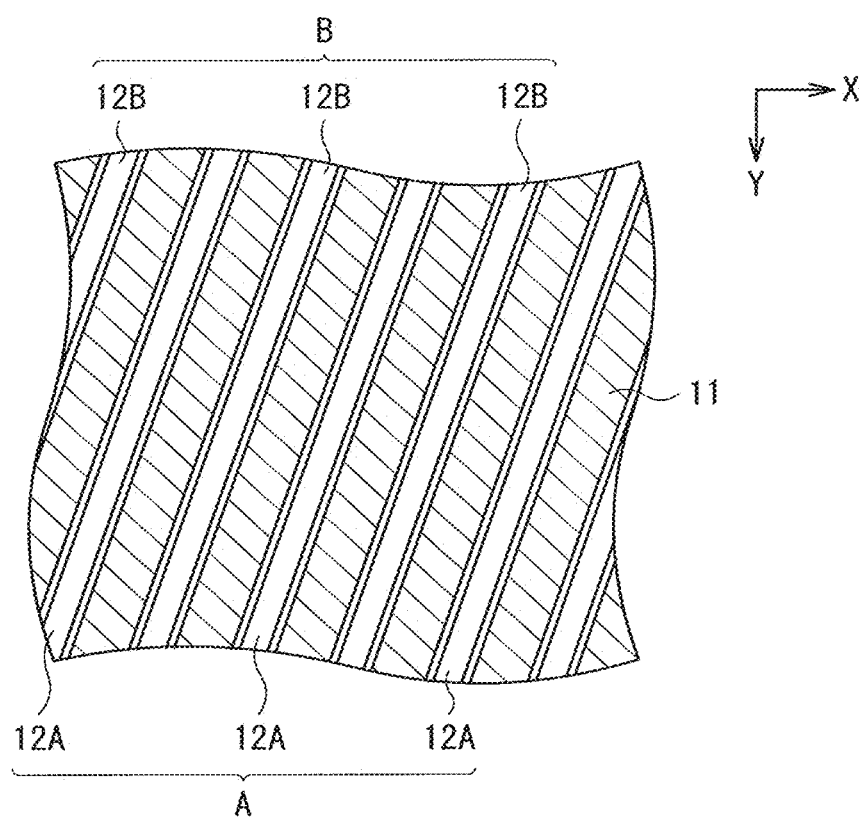
FIG. 8 is a schematic diagram showing an exemplary operation of the liquid crystal barrier of FIG. 1 for stereoscopic display.

FIG. 8 shows an exemplary group configuration of the open/close sections 12. The open/close sections 12 configure two groups, for example. To be specific, a group A includes a plurality of open/close sections 12A, and a group B includes a plurality of open/close sections 12B. These open/close sections 12A and 12B are those alternately disposed.

FIGS. 9A to 9C each schematically show the state of the liquid crystal barrier 10 for stereoscopic display and normal display (two-dimensional display). Specifically, FIG. 9A shows a state for stereoscopic display, FIG. 9B shows another state for stereoscopic display, and FIG. 9C shows a state for normal display. The liquid crystal barrier 10 includes alternately the open/close sections 11 and 12, i.e., the open/close sections 12A in the group A, and the open/close sections 12B in the group B. In this example, the open/close sections 12A and 12B are each provided to every six pixels Pix in the display section 20. In the description below, the pixel Pix is assumed as including three pixels of RGB, but this is surely not restrictive. Alternatively, for example, the pixel Pix may be a sub pixel. Note that, in the liquid crystal barrier 10, any portion where light is to be blocked is hatched in the figure.

For stereoscopic display, in the display section 20, video display based on the video signals SA and SB is performed in a time divisional manner, and also in the liquid crystal barrier 10, the open/close sections 12, i.e., the open/close sections 12A and 12B, are opened and closed in synchronization with the time divisional display on the display section 20 described above. During such opening and closing of the open/close sections 12, the open/close sections 11 are all to remain in the close state, i.e., in the block state. To be specific, although the details will be described later, as shown in FIG. 9A, when the video signal SA is provided, in the liquid crystal barrier 10, the open/close sections 12A are put in the open state, and the open/close sections 12B are put in the close state. The display section 20 displays six eyepoint pictures included in the video signal SA to six adjacent pixels Pix located at the positions corresponding to these open/close sections 12A. Similarly, as shown in FIG. 9B, when the video signal SB is provided, in the liquid crystal barrier 10, the open/close sections 12B are put in the open state, and the open/close sections 12A are put in the close state. The display section 20 displays six eyepoint pictures included in the video signal SB to six adjacent pixels Pix located at the positions corresponding to these open/close sections 12B.

On the other hand, for normal display (two-dimensional display), as shown in FIG. 9C, the display section 20 produces a display based on the video signal S, and in the liquid crystal barrier 10, the open/close sections 11 and 12, i.e., the open/close sections 12A and 12B, are all to remain in the open state, i.e., in the pass-through state.

(Operation and Effects)

Next, described are the operation and effects of the stereoscopic display unit 1 in this embodiment.

(General Description of Entire Operation)

The control section 40 controls the display drive section 50, the backlight drive section 29, and the barrier drive section 9 to operate in synchronization with one another by providing a control signal to each thereof based on a video signal Vdisp provided from the outside. The backlight drive section 29 drives the backlight 30 based on a backlight control signal provided by the control section 40. The backlight 30 emits surface-emitted light to the display section 20. The display drive section 50 drives the display section 20 based on the video signal S provided by the control section 40. The display section 20 performs display by modulating light coming from the backlight 30. The barrier drive section 9 drives the liquid crystal barrier 10 based on a barrier control command provided by the control section 40. The liquid crystal barrier 10 passes or blocks light coming from the backlight 30 after it passes through the display section 20.

(Detailed Operation for Stereoscopic Display)

By referring to several drawings, described next is the detailed operation for stereoscopic display.

FIGS. 10A and 10B each show an exemplary operation of the display section 20, and that of the liquid crystal barrier 10, and specifically, FIG. 10A shows a case where a video signal SA is provided, and FIG. 10B shows a case where a video signal SB is provided.

As shown in FIG. 10A, when a video signal SA is provided, the display drive section 50 displays pixel information pieces P1 to P6 of six pixels to six adjacent pixels Pix in the display section 20. These pixel information pieces P1 to P6 are each corresponding to the six eyepoint pictures included in the video signal SA. The six pixels for displaying these pixel information pieces P1 to P6 are assumed as being those located adjacent to one another in the vicinity of the open/close section 12A. On the other hand, in the liquid crystal barrier 10, as described above, the open/close sections 12A are all controlled to be in the open state (pass-through state), and the open/close sections 12B are all controlled to be in the close state (the open/close sections 11 are all controlled to be in the close state). As such, light coming from each of the pixels Pix in the display section 20 is limited in angle of emission by the open/close sections 12A. In other words, the six eyepoint pictures displayed on the display section 20 in a space divisional manner are separated by the open/close sections 12. As for the eyepoint pictures separated as such, light of picture based on the pixel information piece P3 is viewed by the left eye of a viewer, and light of picture based on the pixel information piece P4 is viewed by the right eye of the viewer such that the pictures are perceived as three-dimensional by the viewer, for example.

This is applicable also to a case when a video signal SB is provided, and as shown in FIG. 10B, the display drive section 50 displays pixel information pieces P1 to P6 of six pixels to six adjacent pixels Pix in the display section 20. These pixel information pieces P1 to P6 are each corresponding to the six eyepoint pictures included in the video signal SB. The six pixels for displaying these pixel information pieces P1 to P6 are assumed as being those located adjacent to one another in the vicinity of the open/close section 12B. On the other hand, in the liquid crystal barrier 10, as described above, the open/close sections 12B are all controlled to be in the open state (pass-through state), and the open/close sections 12A are all controlled to be in the close state (the open/close sections 11 are all controlled to be in the close state). As such, light coming from each of the pixels Pix in the display section 20 is limited in angle of emission by the open/close sections 12B. In other words, the six eyepoint pictures displayed on the display section 20 in a space divisional manner are separated by the open/close sections 12B. As for the eyepoint pictures separated as such, light of picture based on the pixel information piece P3 is viewed by the left eye of a viewer, and light of picture based on the pixel information piece P4 is viewed by the right eye of the viewer such that the pictures are perceived as three-dimensional by the viewer, for example.

As such, as for the viewer, his or her right and left eyes are to see different pixel information pieces of any of those P1 to P6 such that the viewer perceives the pictures as three-dimensional. Moreover, with display of pictures by opening and closing the open/close sections 12A and 12B alternately in a time divisional manner, the viewer is to uniformly view the pictures displayed at not-aligned different positions. As such, the stereoscopic display unit 1 is allowed to accomplish the resolution twice as high as with a case of driving collectively a plurality of open/close sections 12 with no grouping thereof. In other words, the stereoscopic display unit 1 is favorably with the resolution of ⅓ (=⅙×2) of that with the two-dimensional display.

The liquid crystal barrier 10 including the open/close sections 11 and 12 as such includes the liquid crystal layer 14 sealed between the transparent substrates 13A and 13B, and is changed in state between light-passing and blocking by an individual voltage application to each region corresponding to each of the open/close sections 11 and 12. Accordingly, as for the transparent electrode layers 15a and 15b for application of a voltage to the liquid crystal layer 14, the transparent electrode layer 15a is divided into a plurality of sub-electrodes 15a1 and 15a2. Moreover, in such a configuration, the spacer 16 for use to control the thickness of the liquid crystal layer 14 is disposed in a plurality of predetermined regions. In the below, described are the effects of the placement of the spacers 16 by a comparative example.

Comparative Example

Figure 11A:
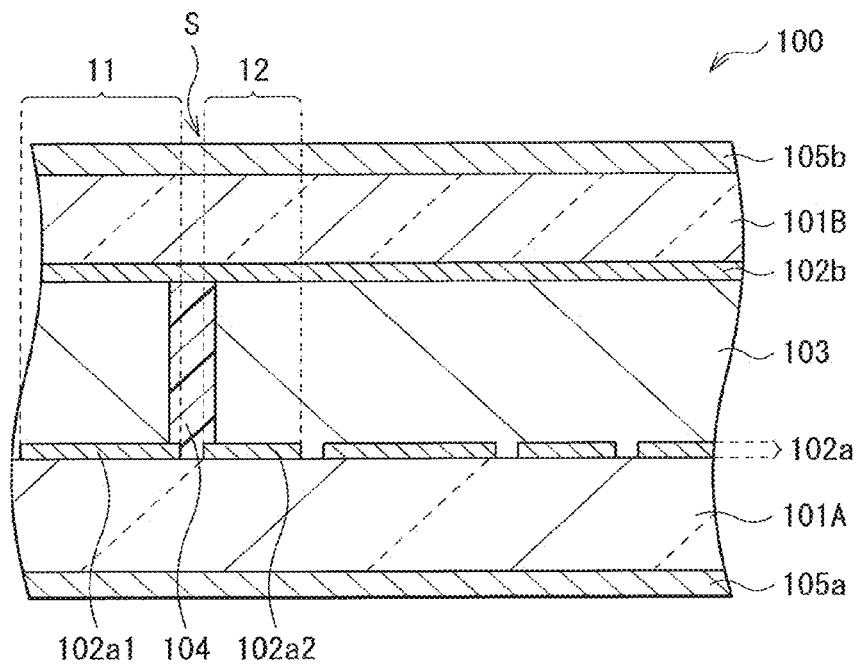
FIGS. 11A and 11B are schematic diagrams respectively showing an exemplary cross-sectional configuration of a liquid crystal barrier in a comparative example, and an exemplary configuration thereof in a planar view.
Figure 11B:
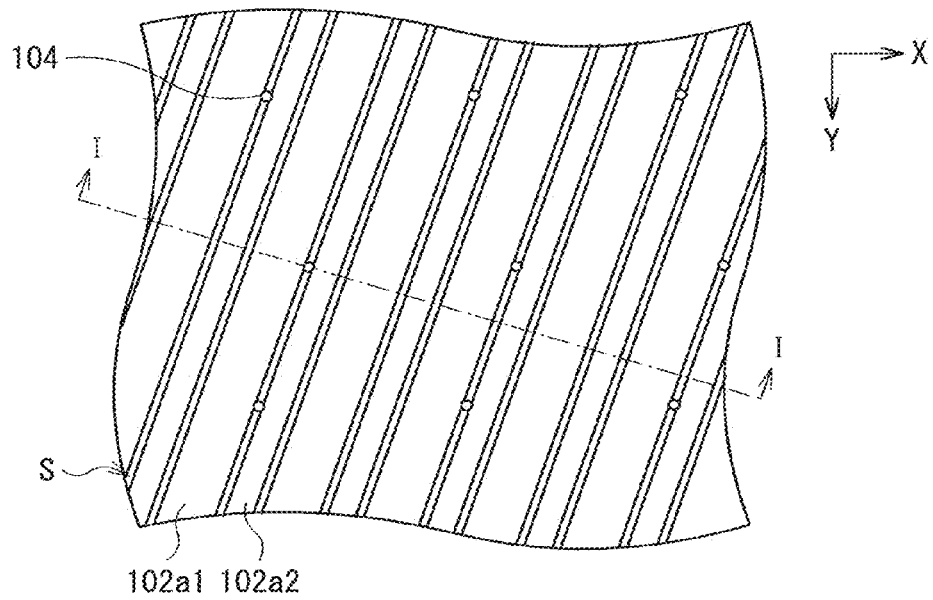

FIGS. 11A and 11B are diagrams respectively showing an exemplary cross-sectional configuration of a liquid crystal barrier (a liquid crystal barrier 100) in a comparative example, and the placement configuration of spacers therein. Similarly to the embodiment, the liquid crystal barrier 100 includes a liquid crystal layer 103 sealed between transparent substrates 101A and 101B, and is provided with transparent electrode layers 102a and 102b for application of a voltage to the liquid crystal layer 103. The transparent substrate 101A is affixed with a polarizing plate 105a on the light incident side, and the transparent substrate 101B is affixed with a polarizing plate 105b on the light exit side. As for the transparent electrode layers 102a and 102b, the transparent electrode layer 102a is divided into a plurality of transparent electrodes 102a1 and 102a2, and regions corresponding to the transparent electrodes 102a1 and 102a2 are respectively open/close sections. In such a configuration, spacers 104 are provided by insertion between the transparent substrates 101A and 101B with the aim of controlling the thickness of the liquid crystal layer 103. Note that, in the liquid crystal barrier 100 in this comparative example, the spacers 104 are each so disposed as to lie across the region between the transparent electrodes 102a1 and 102a2, i.e., disposed in the boundary section S.

The issue here is that, if the spacers 104 are disposed in the boundary sections S as such, the orientation of the liquid crystal layer 103 is largely disturbed with ease due to the influence of edges of the transparent electrodes 102a1 and 102a2, i.e., specifically due to the generation of the fringe field. When the liquid crystal layer 103 is driven in the normally-white mode, for example, a voltage is applied to any region corresponding to the transparent electrode 102a2 (or to the transparent electrode 102a1) for black display. In this case, the region in the vicinity of each of the spacers 104 partially passes light therethrough too much because the liquid crystal orientation is not in a desired direction. As a result, too much light leakage occurs in the vicinity of each of the spacers 104 so that the portion looks more whitish than the remaining area.

On the other hand, in the embodiment, the spacers 16 are disposed in regions not including the boundary sections S, i.e., in portions other than boundary region. In other words, the spacers 16 are each disposed in a region on the sub-electrode 15a2 where the liquid crystal orientation is stable, thereby preventing a change of transmittance to be caused by the placement of the spacers as in the comparative example.

Example

Figure 12A:
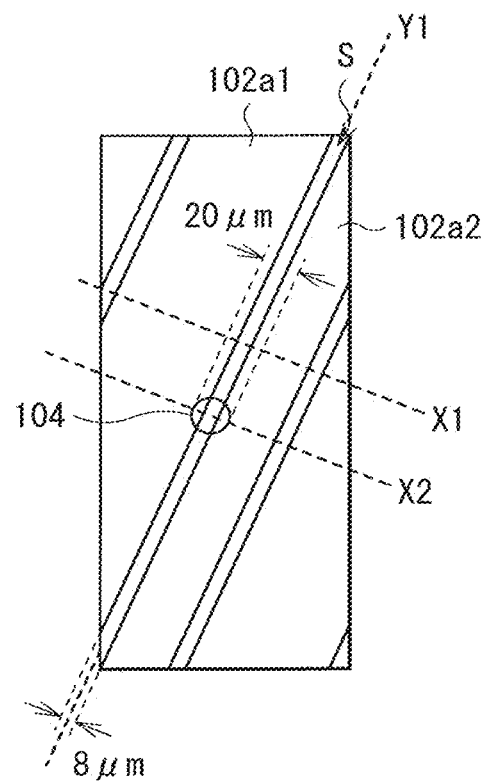
FIGS. 12A and 12B are schematic diagrams respectively showing the spacer arrangement and the component dimensions in the comparative example, and those in Example 1.
Figure 12B:
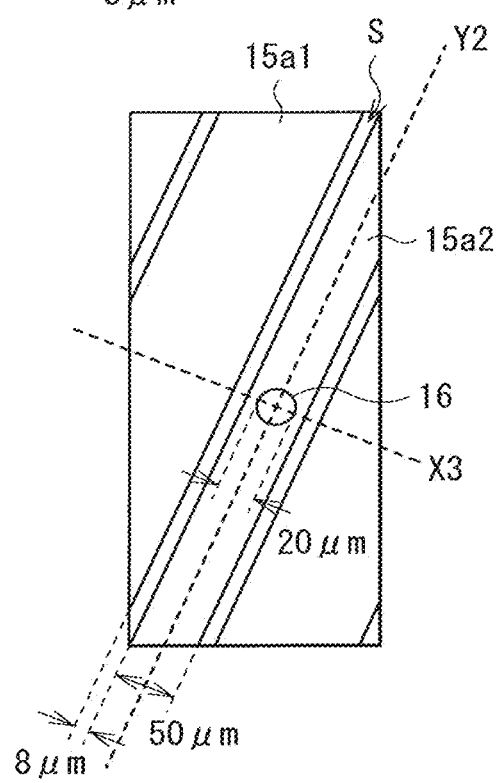

Herein, a simulation was performed for the electric field distribution and the state of orientation in a liquid crystal layer in two cases, i.e., one with the spacers 104 disposed in the boundary sections S as in the comparative example, and the other with the spacers 16 disposed in the portions other than boundary region (on the sub-electrodes 15a2) as in the embodiment, i.e., Example 1. For this simulation, in the comparative example, the spacers 104 were each disposed directly on the boundary section S as shown in FIG. 12A, and the boundary section S was set to have the width of 8 μm, and the spacer 104 to have the diameter of 20 μm. On the other hand, in Example 1, as shown in FIG. 12B, the spacers 16 were each disposed at the center portion on the sub-electrode 15a2, and the boundary S was set to have the width of 8 μm, the spacer 16 to have the diameter of 20 μm, and the sub-electrode 15a2 to have the width (E2) of 50 μm. Moreover, in both the comparative example and Example 1, the liquid crystal layer was set to have the thickness (the height of the spacer) of 3.5 μm.

Figure 13A:
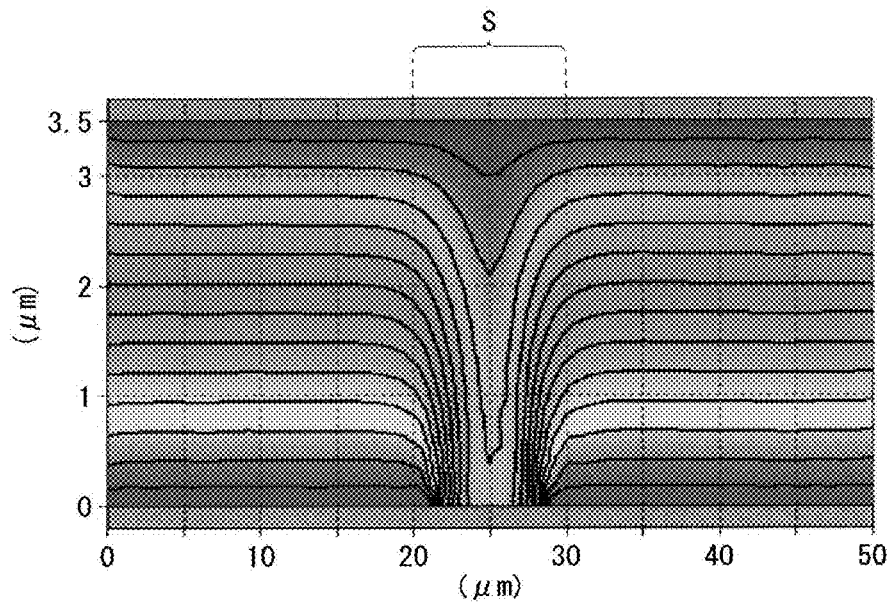
FIGS. 13A and 13B are each a characteristics diagram showing the isopotential map (with no spacer) at an electrode boundary and therearound during black display.
Figure 13B:
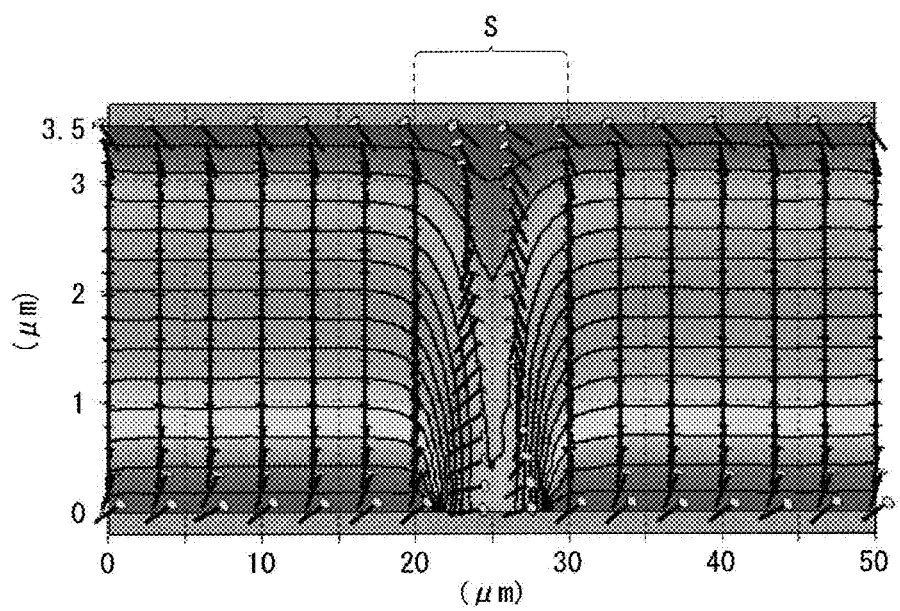
Figure 14A:
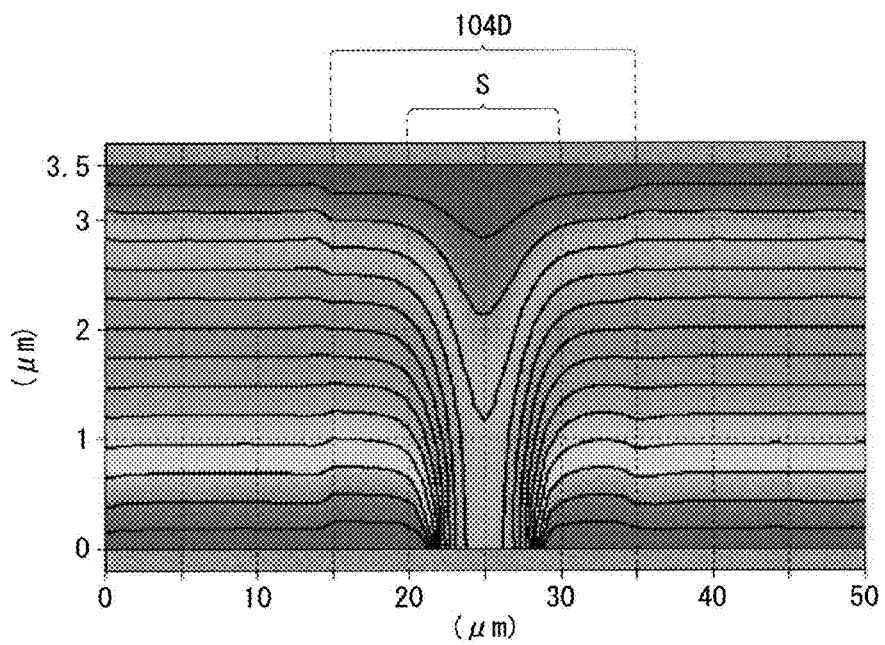
FIGS. 14A and 14B are each a characteristics diagram showing the isopotential map (with a spacer at the portion of an electrode boundary) during black display in the comparative example.
Figure 14B:
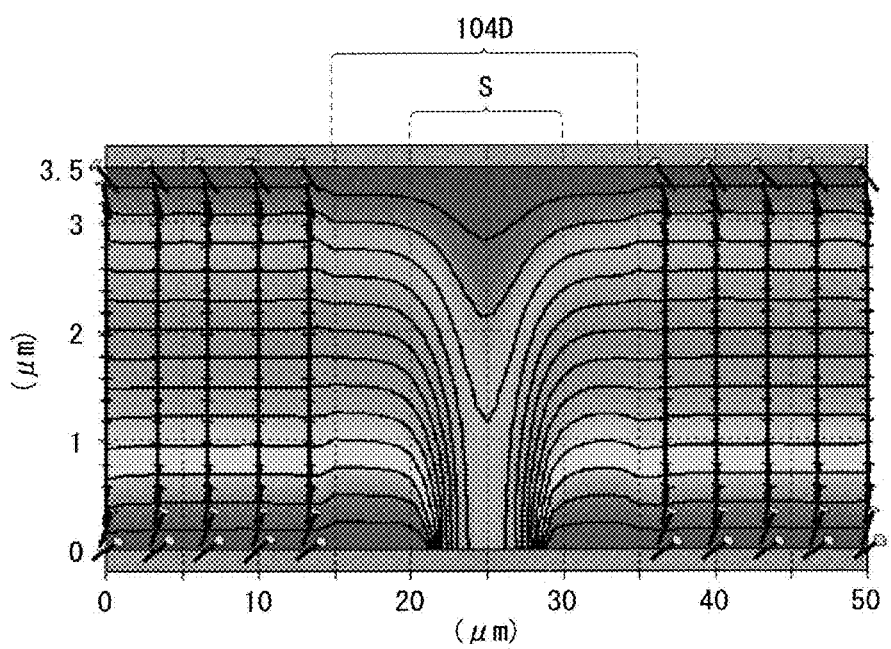
Figure 15A:
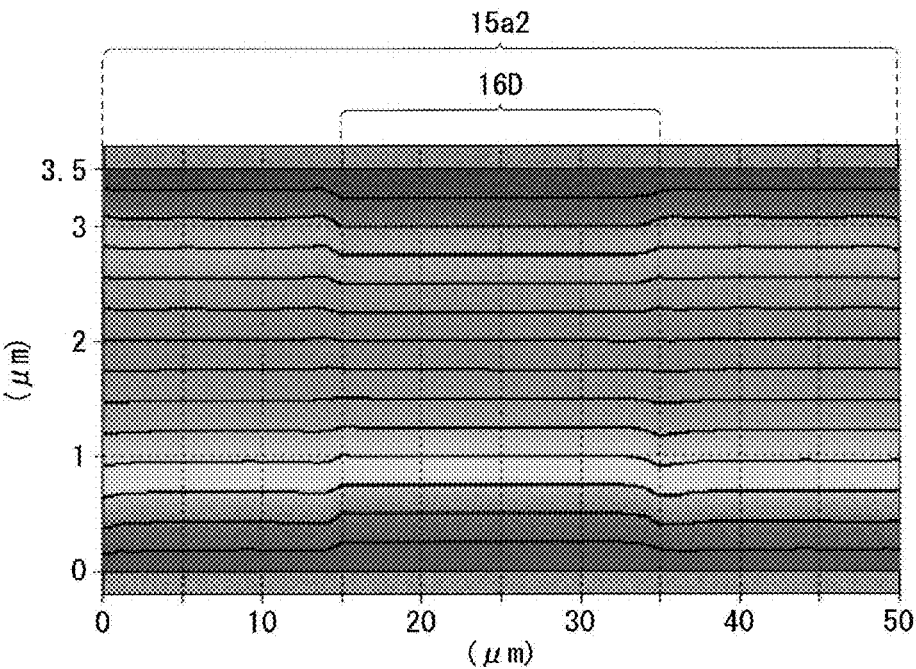
FIGS. 15A and 15B are each a characteristics diagram showing the isopotential map (with a spacer at the portion other than boundary between electrodes) during black display in Example 1.
Figure 15B:
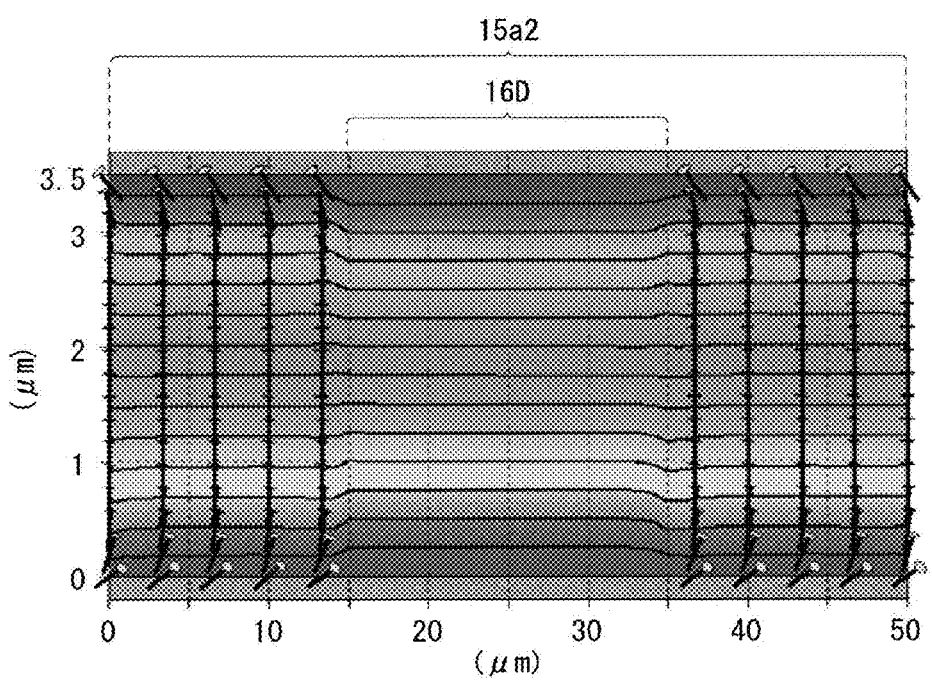

FIG. 14A shows the isopotential map being a calculation result as such in the comparative example, and FIG. 14B shows the state of liquid crystal orientation therein. FIG. 15A shows the isopotential map in Example 1, and FIG. 15B shows the state of liquid crystal orientation therein. Moreover, FIGS. 13A and 13B respectively show the isopotential map in the vicinity of the boundary section S, and the state of liquid crystal orientation therein. Herein, FIGS. 13A and 13B each correspond to the cross section in the vicinity of the boundary section S along a line X1 of FIG. 12A, and FIGS. 14A and 14B each correspond to the cross section in the vicinity of the boundary section S along a line X2 thereof. FIGS. 15A and 15B each correspond to the cross section of the open/close section 12, i.e., region corresponding to the sub-electrode 15a2, along a line X3 of FIG. 12B. The change of color represents the change of electric potential, showing the gradual increase of electric potential in order of blue, green, yellow, orange, and red, i.e., the portion of blue is at the lowest potential (0 V in this example), and the portion of red is at the highest potential (7 V in this example).

As shown in FIGS. 13A and 13B, in the region corresponding to the boundary section S, the fringe field is generated due to the influence of the edges of the electrodes. The liquid crystal orientation is thus known to be disturbed because the liquid crystal molecules do not arise enough. As such, as in the comparative example, if the spacers 104 are disposed in the boundary sections S, the electric field distribution and the liquid crystal orientation look like those shown in FIGS. 14A and 14B, respectively. Therefore, in the region corresponding to the boundary section S, i.e., the cross section along a line Y1 of FIG. 12A, the electric field distribution of FIG. 13A and that of FIG. 14A both exist. This means that, also as for the liquid crystal orientation, the state of orientation of FIG. 13B and that of FIG. 14B both exist around the spacer 104. As a result, in the vicinity of the spacer 104, the liquid crystal orientation becomes more unstable, thereby easily causing light leakage in the boundary section S and in the region in the vicinity of the spacer 104. Note that, in FIGS. 14A and 14B, a reference numeral 104D denotes the region where the spacer 104 is disposed.

On the other hand, in Example 1, as shown in FIGS. 15A and 15B, the liquid crystal orientation is not disturbed because the spacer 16 is disposed on the sub-electrode 15a2 where the electric field distribution is flat. And thereby, the electric field distribution becomes symmetric on the cross section along the line X3 and that along the line Y2 so that the liquid crystal orientation becomes stable. Note that, in FIGS. 15A and 15B, a reference numeral 16D denotes the region where the spacer 16 is disposed. As such, in the embodiment in which the spacer 16 is disposed in the portion other than boundary region between the open/close sections 11 and 12, the liquid crystal orientation is not disturbed due to the placement of the spacer, thereby favorably preventing a change of transmittance that is to be caused thereby.

With the spacer 16 disposed on the sub-electrode 15a2, i.e., with the spacer 16 disposed in the open/close section 12 that is to be displayed in white during stereoscopic display, the effects as below are favorably produced. Since the spacer 16 affects the liquid crystal orientation therearound, the light leakage occurs in the area around the spacer 16, and thus the resulting display is not black enough. As such, by providing the spacers 16 not in the open/close sections 11 (not on the sub-electrodes 15a1) used for black display (block regions) but in the open/close sections 12 (on the sub-electrodes 15a2) used as white display (pass-through regions), the light leakage in portions of black display is successfully prevented.

In this case, the spacers 16 are each desirably absent from the edge 150e of the sub-electrode 15a2, and more desirably, they are each disposed at the center portion on the sub-electrode 15a2. This means that the spacers 16 are to be disposed at regions where the electric field distribution is flatter, thereby preventing more the liquid crystal orientation from being disturbed by the placement of the spacers.

As described above, in the embodiment, the display section 20 displays a plurality of eyepoint pictures in a space divisional manner, and thus displayed pictures are passed or blocked by the plurality of open/close sections 11 and 12 of the liquid crystal barrier 10. As such, as for a viewer, his or her right and left eyes perceive different perspective images so that the stereoscopic display is produced. In the liquid crystal barrier 10, by providing the spacers 16 in the regions not including the boundary sections S (portions other than boundary region; on the sub-electrodes 15a2 in this example), the spacers 16 are to be positioned in any region where the electric field distribution is flat, i.e., region where the liquid crystal orientation is stable, thereby being able to preventing any change of transmittance resulted from the placement of the spacers. As such, realized is the liquid crystal barrier 10 capable of preventing any possible occurrence of light unevenness.

Note that, in the embodiment described above, exemplified is the case where the spacers 16 are disposed in the open/close sections 12. However, the spacers 16 may serve well as long as they are disposed in the regions not including the boundary sections S, i.e., may be disposed in the open/close sections 11. However, with the reasons described above, the spacers 16 are desirably disposed not in the open/close sections 11 of black display but in the open/close sections 12 of white display.

(Modification)

Described next is a liquid crystal barrier in a modification of the embodiment described above. Herein, any component same as that in the embodiment described above is provided with the same reference numeral, and is not described again if appropriate.

(Configuration)

Figure 16A:
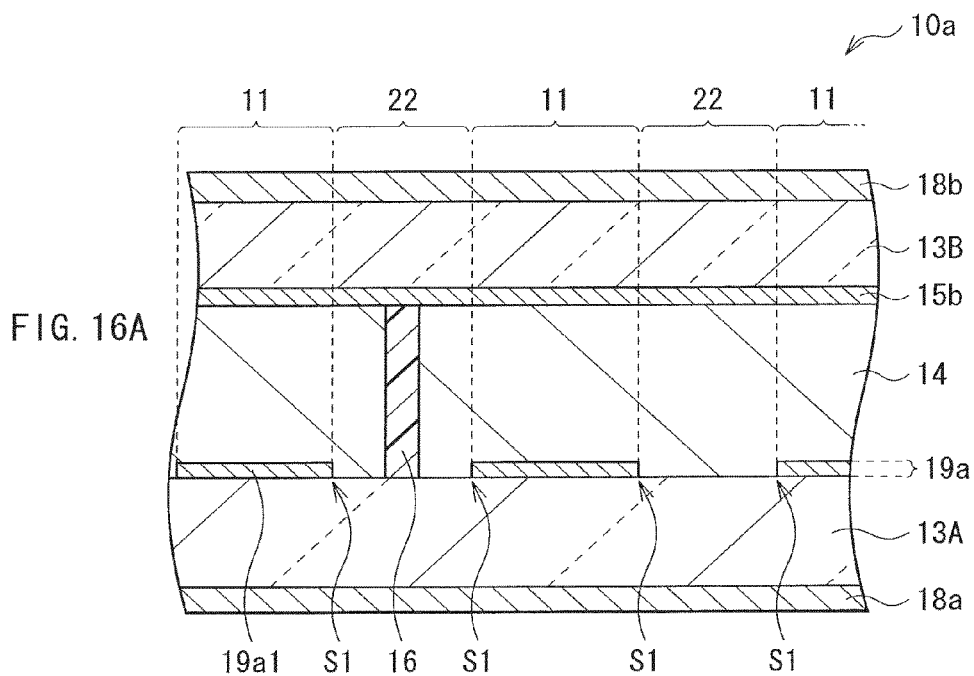
FIGS. 16A and 16B are schematic diagrams respectively showing an exemplary cross-sectional configuration of a liquid crystal barrier in a modification, and an exemplary configuration thereof in a planar view.
Figure 16B:
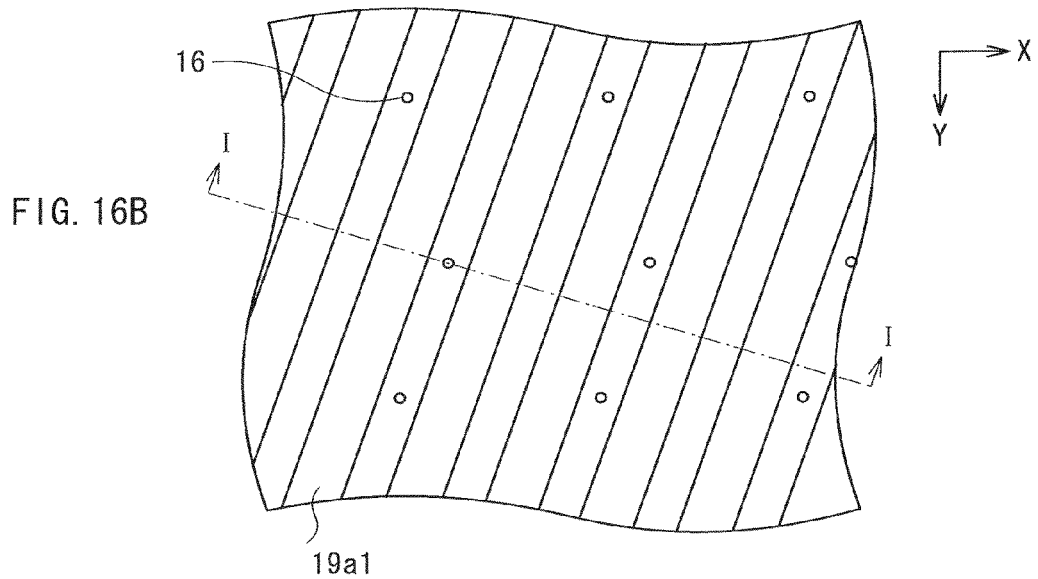

FIG. 16A shows the cross-sectional configuration of a liquid crystal barrier in a modification, i.e., a liquid crystal barrier 10a, and FIG. 16B is a schematic planar view in the XY plane showing the positional relationship between transparent electrode layers and spacers. The liquid crystal barrier 10a is a parallax barrier for use in a stereoscopic display unit including the backlight 30 and the display section 20 similarly to those in the embodiment described above. The liquid crystal barrier 10a is configured to include the liquid crystal layer 14, and for stereoscopic display, is driven such that regions for light blocking and regions for light passing are alternately formed.

In the liquid crystal barrier 10a in this modification, a plurality of open/close sections 11, i.e., third sub-regions, and a plurality of light-passing sections 22, i.e., fourth sub-regions, are alternately disposed. The open/close sections 11 are allowed to be changed in state between light passing and blocking, and the light-passing sections 22 typically pass light therethrough irrespective of a drive voltage. In other words, in the liquid crystal barrier 10a, similarly to the embodiment described above, the open/close sections 11 are controlled to be in the open state during normal display, and are controlled to be in the close state during stereoscopic display. On the other hand, the light-passing sections 22 are controlled to be in the open state irrespective of which display, i.e., normal display or stereoscopic display. In the below, the specific configuration of such a liquid crystal barrier 10a is described.

Similarly to the liquid crystal barrier 10 in the embodiment described above, the liquid crystal barrier 10a includes the liquid crystal layer 14 between the transparent substrates 13A and 13B. The surface of the transparent substrate 13A on the liquid crystal layer 14 side is formed with a transparent electrode layer 19a, and the surface of the transparent substrate 13B on the liquid crystal layer 14 side is formed with the transparent electrode layer 15b. The transparent substrate 13A is affixed with the polarizing plate 18a on the light incident side, and the transparent substrate 13B is affixed with the polarizing plate 18b on the light exit side.

At least either the transparent electrode layer 19a or 15b (the transparent electrode layer 19a in this example) is divided into a plurality of sub-electrodes 19a1 similarly to the embodiment described above. Note that, in this modification, these sub-electrodes 19a1 are disposed only in the open/close sections 11, and are not disposed in the light-passing sections 22. In other words, the light-passing sections 22 are electrode no-forming regions of including no electrode at least on the side of one of the transparent substrates. As for the transparent electrode layer 15b on the transparent substrate 13B side, similarly to the embodiment described above, it is a so-called solid electrode formed for shared use by a plurality of sub-electrodes 19a1. With such a configuration, the open/close sections 11 are allowed to be changed in state between light blocking and passing by application of a drive voltage. On the other hand, the light-passing sections 22 serve as light-passing regions of typically white display when the liquid crystal layer 14 is driven in the normally-white mode, for example.

The open/close sections 11 are so disposed as to extend at predetermined intervals corresponding to the light-passing sections 22 in one direction in the XY plane, e.g., a direction at a predetermined angle of θ from the horizontal direction X. Herein, the open/close sections 11 and the light-passing sections 22 may each have different width or not.

In such a configuration, also in this modification, a plurality of spacers 16 are disposed by insertion between the transparent substrates 13A and 13B for controlling the thickness of the liquid crystal layer 14. The spacers 16 are provided to a plurality of selective regions on the XY plane of the liquid crystal barrier 10, specifically in regions not including the boundary sections S1, i.e., portions other than boundary region between the open/close sections 11 and the light-passing sections 22. In other words, the spacers 16 are provided not in the edge portions of the sub-electrodes 19a1, i.e., absent from the edge portions thereof. To be specific, the spacers 16 are each provided at the center portion of the light-passing section 22. The spacers 16 are desirably provided in the light-passing sections 22 among such regions not including the boundary sections S1, i.e., the open/close sections 11 and the light-passing sections 22. This is because, in the normally-white mode, the area around the spacers 16 is not displayed in black enough as described in the embodiment above, and thus the spacers 16 are desirably disposed not in the regions of black display but in the regions of white display.

(Effects)

In this modification, a stereoscopic display is produced as a result of separation of eyepoint pictures by light coming from the backlight 30 being blocked by the open/close sections 11 in the liquid crystal barrier 10 after it passing through the display section 20, and then by it passing through the light-passing sections 22. In this modification, since every light-passing section 22 remains to serve as a typically light-passing section, display is not performed in a time divisional manner as a group basis as in the embodiment described above, but there is no need for a voltage supply to the light-passing sections 22. Accordingly, the electrode wiring is reduced such that the configuration is favorably simplified. Herein, a two-dimensional display is realized by leaving the open/close sections 11 in the open state.

The liquid crystal barrier 10a as above includes a plurality of spacers 16 between the transparent substrates 13A and 13B. Also in this modification, these spacers 16 are disposed in regions not including the boundary sections S1. Since the open/close sections 11 are each provided with the sub-electrode 19a1, in the boundary sections S1, the fringe field is generated due to the influence of the edges of the sub-electrodes 19a1, whereby the liquid crystal orientation is disturbed. In this modification, by providing the spacers 16 not in such regions where the liquid crystal orientation is disturbed, the possible disturbance of the liquid crystal orientation to be caused by the placement of the spacers is to be possibly prevented. Moreover, by providing the spacers 16 to the light-passing sections 22 of typically white display, as described above, any change of transmittance possibly caused by light passing through the spacers 16 themselves is to be possibly prevented. As such, the effects similar to those in the embodiment described above are possibly achieved.

Example

Herein, a simulation was performed for the electric field distribution and the state of orientation in a liquid crystal layer in a case where the spacers 16 are disposed in the portions other than boundary region (the light-passing sections 22) as in the modification, i.e., Example 2. For this simulation, the spacers 16 were each disposed at the center portion of the region corresponding to the light-passing section 22, i.e., the region between the sub-electrodes 19a1. The spacer 16 was set to have the diameter of 20 μm, the light-passing section 22 to have the width of 50 μm, and the liquid crystal layer to have the thickness (the height of the spacer) of 3.5 μm.

Figure 17:
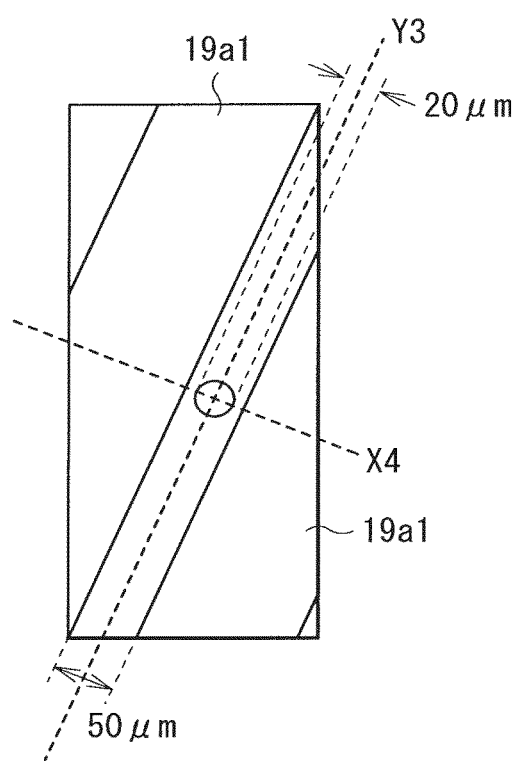
FIG. 17 is a schematic diagram showing the spacer arrangement and the component dimensions in Example 2.
Figure 18A:
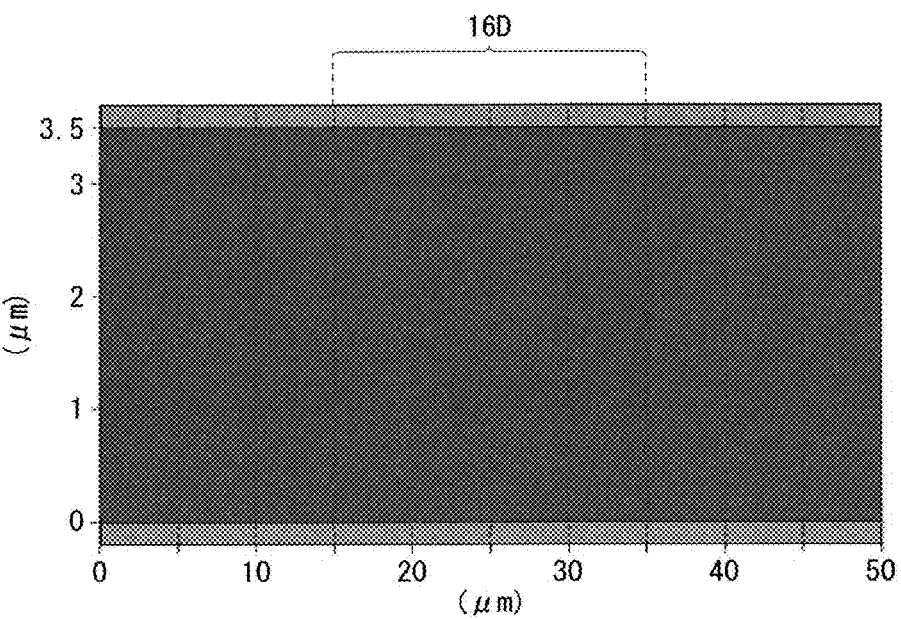
FIGS. 18A and 18B are each a characteristics diagram showing the isopotential map during black display in Example 2.
Figure 18B:
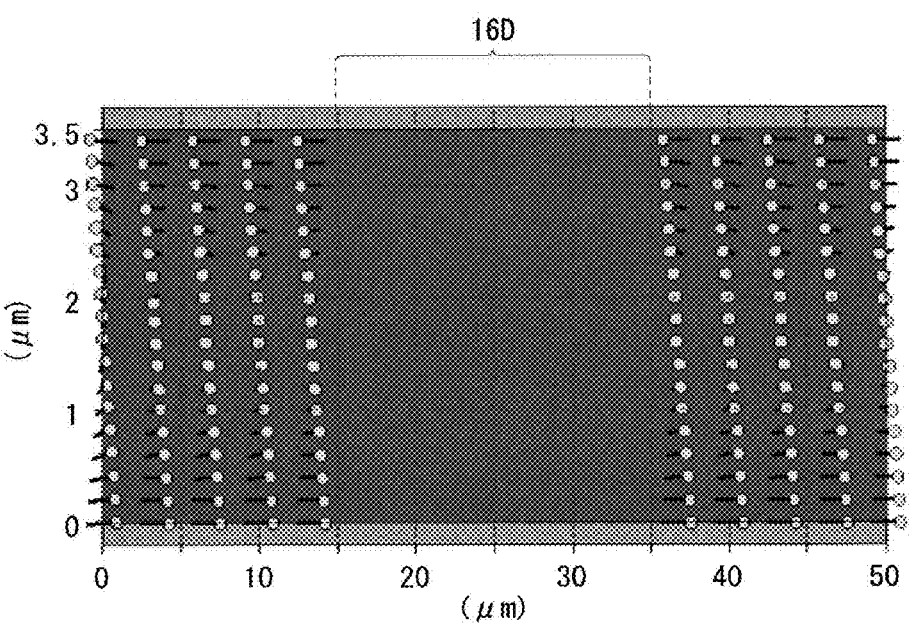

FIG. 18A shows the isopotential map being a calculation result as such in Example 2, and FIG. 18B shows the state of liquid crystal orientation therein. Herein, FIGS. 18A and 18B each correspond to the cross section of the light-passing section 22 along a line X4 of FIG. 17. The relationship between the electric potential and the color is similar to that in the Example 1 described above. However, since the light-passing section 22 has no electrode on the transparent substrate 13A side, the liquid crystal layer 14 is at 0 V in its entirety, for example. In Example 2 as such, since the spacers 16 are disposed in the light-passing sections 22 each being a region of typically white display, the liquid crystal orientation is not disturbed in the open/close sections 11 each being a region of black display.

Note that, in the modification described above, exemplified is the case where the spacers 16 are disposed in the light-passing sections 22. However, the light-passing sections 22 are surely not restrictive, and the spacers 16 may serve well as long as they are disposed in the regions not including the boundary sections S1, i.e., absent from the edge portions of the sub-electrodes 19a1. Alternatively, the spacers 16 may be disposed in the open/close sections 11. However, as described above, the spacers 16 are desirably disposed not in the open/close sections 11 of black display but in the open/close sections 12 of white display, i.e., the light-passing sections 22 in this example.

As such, while the present disclosure has been described in detail with the embodiment and the modification, the foregoing description is in all aspects illustrative and not restrictive. It is understood that numerous other modifications and variations is to be devised. For example, in the embodiment and others described above, the display section 20 and the liquid crystal barrier 10 are disposed in order from the backlight 30 side. Alternatively, the positional relationship between the display section 20 and the liquid crystal barrier 10 may be inverted. In other words, between the backlight 30 and the display section 20, the liquid crystal barrier 10 may be provided. If this is the configuration, stereoscopic display is realized by an open/close operation in the open/close sections of the liquid crystal barrier 10 in synchronization with video display on the display section 20 as described above.

Figure 19:
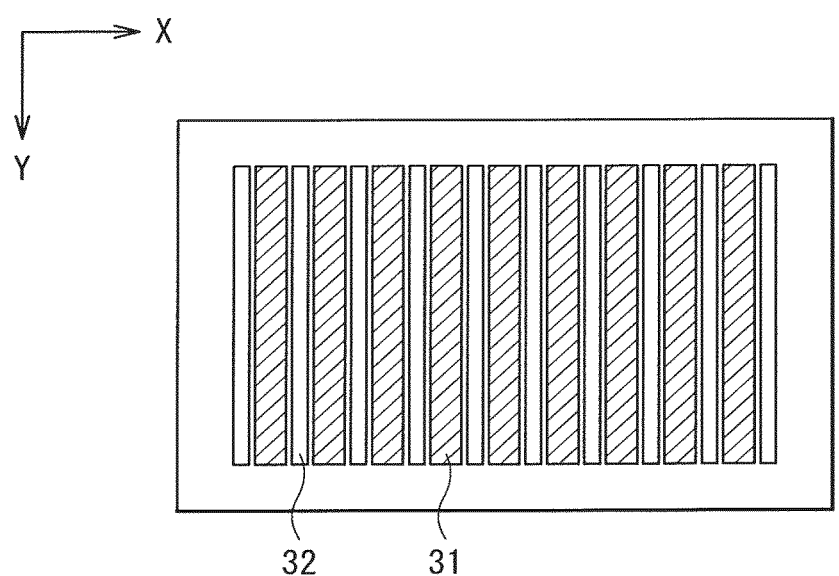
FIG. 19 is a schematic diagram showing the configuration of open/close sections in a liquid crystal barrier in another modification.

Moreover, in the embodiment and others described above, exemplified is the case where a plurality of open/close sections in the liquid crystal barrier extends in the diagonal direction on the XY plane. The placement of the open/close sections is not restricted to such a diagonal direction. As shown in FIG. 19, for example, a plurality of open/close sections 31 and 32 may be provided alternately and along a Y direction for light passing or blocking.

Furthermore, also in the embodiment described above, for stereoscopic display, in the plurality of open/close sections 11 and 12 in the liquid crystal barrier 10, the open/close sections 11 are driven to remain in the close state, and the open/close sections 12 to be in the open state based on a video signal. Alternatively, such driving may be performed inversely, i.e., the open/close sections 12 are put to remain in the close state, and the open/close section 11 are put in the open state based on a video signal.

Still further, in the embodiment described above, for deriving a high resolution, out of the open/close sections 11 and 12, the open/close sections 12 are divided into two groups A and B, and these groups A and B are driven in a time divisional manner. In the present disclosure, however, video display in a time divisional manner as such is not necessarily expected. In other words, as an example, every open/close section 11 in the liquid crystal barrier 10 may be driven to be in the close state, and every open/close section 12 may be driven to be in the open state, thereby separating eyepoint pictures. Still alternatively, the open/close sections 12 may be divided into three groups or more, and these three or more groups may be driven sequentially.

Still further, in the embodiment and others described above, the video signals SA and SB are each assumed to include six eyepoint pictures. This is surely not the only option, and the video signals may each include five eyepoint pictures or less, or seven eyepoint pictures or more. When the video signal includes five eyepoint pictures, for example, the open/close sections 12 may be each provided to every five pixels Pix in the display section 20. Herein, the eyepoint pictures are not necessarily provided as many as the pixels for display thereof. In other words, for example, the pixel information pieces for display to the plurality of adjacent pixels may not necessarily be those viewed from different eyepoints, and some may be those viewed from the same eyepoint.

What is claimed is:

1. A light barrier device comprising:
a liquid crystal layer sealed between a pair of substrates, to include a plurality of sub-regions each sub-region configured to allow light to or from several pixels of a display section to pass therethrough or to be blocked; and
spacers each provided, between the pair of substrates, in a region not including a boundary region between the sub-regions.

2. The light barrier device according to claim 1, further comprising:
a pair of electrodes allowing the liquid crystal layer to be supplied with a voltage, wherein
one or both of the pair of electrodes each includes a sub-electrode for each of the sub-regions, and
the spacers are provided on sub-electrodes selected from a plurality of sub-electrodes.

3. The light barrier device according to claim 2, wherein
the sub-regions include a first sub-region allowing light to pass therethrough, and a second sub-region allowing light to be blocked, and
a spacer is provided on a sub-electrode in the first sub-region.

4. The light barrier device according to claim 3, wherein the spacer is absent from an edge of the sub-electrode.

5. The light barrier device according to claim 4, wherein the spacer is provided at a center away from the edge of the sub-electrode.

6. The light barrier device according to claim 1, further comprising:
a pair of electrodes allowing the liquid crystal layer to be supplied with a voltage, wherein
one or both of the pair of electrodes each include a plurality of sub-electrodes, and
the spacer is provided only in a third sub-region selected from the sub-regions.

7. The light barrier device according to claim 6, wherein
the third sub-region allows light to be blocked, and another fourth sub-region selected from the sub-regions allows light to pass therethrough,
the spacer is provided in the fourth sub-region.

8. The light barrier device according to claim 7, wherein a spacer is provided at a center of the fourth sub-region.

9. The light barrier device according to claim 1, wherein the liquid crystal layer is driven in a normally-white mode.

10. A light barrier device, comprising:
a liquid crystal layer provided between a pair of substrates;
a plurality of sub-electrodes provided to the pair of substrates, configured to perform switching drive to allow a transmittance of the liquid crystal layer to be changed and to thereby allow light to or from several pixels of a display section to pass therethrough or to be blocked; and
spacers provided between the pair of substrates, wherein each of the spacers is provided on each of the sub-electrodes in a region not including a boundary region between the sub-electrodes.

11. The light barrier device according to claim 10, wherein the spacers are provided only on sub-electrodes to be driven at a same timing, of the plurality of sub-electrodes.

12. A display unit comprising a display section and a light barrier device, the light barrier device comprising:
a liquid crystal layer sealed between a pair of substrates, and including a plurality of sub-regions each sub-region configured to allow light to or from several pixels of the display section to pass therethrough or to be blocked; and
spacers each provided, between the pair of substrates, in a region not including a boundary region between the sub-regions.

* * * * *